United States Patent
Ali et al.

(10) Patent No.: US 12,494,881 B2
(45) Date of Patent: Dec. 9, 2025

(54) DEMODULATION REFERENCE SIGNAL CONFIGURATION

(71) Applicant: Lenovo (Singapore) Pte. Ltd., New Tech Park (SG)

(72) Inventors: Ali Ramadan Ali, Kraiburg am Inn (DE); Ankit Bhamri, Rödermark (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 442 days.

(21) Appl. No.: 18/008,428

(22) PCT Filed: Jun. 5, 2021

(86) PCT No.: PCT/IB2021/054941
§ 371 (c)(1),
(2) Date: Dec. 5, 2022

(87) PCT Pub. No.: WO2021/245632
PCT Pub. Date: Dec. 9, 2021

(65) Prior Publication Data
US 2023/0231683 A1   Jul. 20, 2023

Related U.S. Application Data

(60) Provisional application No. 63/035,566, filed on Jun. 5, 2020.

(51) Int. Cl.
*H04L 5/00* (2006.01)
*H04L 25/02* (2006.01)

(52) U.S. Cl.
CPC .......... *H04L 5/0051* (2013.01); *H04L 5/0092* (2013.01); *H04L 25/0224* (2013.01)

(58) Field of Classification Search
CPC . H04L 5/0051; H04L 5/0092; H04L 25/0224; H04L 5/0023
See application file for complete search history.

(56) References Cited

U.S. PATENT DOCUMENTS

2019/0007152 A1    1/2019   Yi et al.
2021/0320772 A1*  10/2021  Zewail ................. H04L 5/0051

FOREIGN PATENT DOCUMENTS

EP         3852297 A1 *  7/2021  ......... H04L 25/0224
WO   WO-2018064608 A1 *  4/2018  ....... H04L 27/26025
(Continued)

OTHER PUBLICATIONS

Mitsubishi Electric, "Views on physical layer design for NR V2X sidelink", 3GPP TSG RAN WG1 #96b R1-1905123, Apr. 8-12, 2019, pp. 1-17 (Year: 2019).*
(Continued)

*Primary Examiner* — Chae S Lee
(74) *Attorney, Agent, or Firm* — Kunzler Bean & Adamson

(57) ABSTRACT

Apparatuses, methods, and systems are disclosed for enhanced DM-RS configuration. One apparatus in a mobile communication network includes a processor and a transceiver that receives a first indication of a configuration for Demodulation Reference Signal ("DM-RS"), where the DM-RS configuration includes a plurality of DM-RS configuration types. The transceiver also receives a second indication to autonomously switch among the plurality of DM-RS configuration types based on a configured subcarrier spacing value for a channel. The processor performs single channel estimation from multiple indicated antenna ports using the DM-RS configuration.

19 Claims, 10 Drawing Sheets

(56) References Cited

FOREIGN PATENT DOCUMENTS

WO  2020052380 A1  3/2020
WO  2021178788 A1  9/2021

OTHER PUBLICATIONS

PCT/IB2021/054941, "Notification of Transmittal of the International Search Report and the Written Opinion of the International Searching Authority, or the Declaration", International Searching Authority, Oct. 11, 2021, pp. 1-13.

TCL Communication, "On Sidelink DMRS Design for NR V2X", 3GPP TSG RAN WG1 Meeting #96 R1-1902545, Feb. 25-Mar. 1, 2019, pp. 1-3.

Mitsubishi Electric, "Views on physical layer design for NR V2X sidelink", 3GPP TSG RAN WG1 #96b R1-1905123, Apr. 8-12, 2019, pp. 1-17.

Qualcomm, "New WID on Extending current NR operation to 71 GHz", 3GPP TSG RAN Meeting #86 RP-193229, Dec. 9-12, 2019, pp. 1-5.

Intel Corp., "New SID: Study on supporting NR from 52.6GHz to 71 GHz", 3GPP TSG RAN Meeting #86 RP-193259, Dec. 9-12, 2019, pp. 1-3.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

\* cited by examiner

Resource Block 161

Resource Block 162

Resource Block 163

Resource Block 164

Resource Block 165

Resource Block 171

Resource Block 172

Resource Block 173

Resource Block 174

Resource Block 175

DEMODULATION REFERENCE SIGNAL CONFIGURATION

CROSS-REFERENCE TO RELATED APPLICATIONS

This application claims priority to U.S. Provisional Patent Application No. 63/035,566 entitled "DM-RS CONFIGURATION FOR ENHANCING CHANNEL ESTIMATION AT HIGH SUBCARRIER SPACING" and filed on Jun. 5, 2020 for Ali Ramadan Ali, Ankit Bhamri, and Vijay Nangia, which application is incorporated herein by reference.

FIELD

The subject matter disclosed herein relates generally to wireless communications and more particularly relates to Demodulation Reference Signal ("DM-RS") configuration for enhancing channel estimation at high subcarrier spacing ("SCS").

BACKGROUND

In certain wireless communication systems, a radio access network may support NR-based operation on frequencies between 52.6 GHz and 71 GHz. For better robustness against phase noise at high frequency (beyond 52.6 GHz), high SCS (i.e., higher than those supported in Rel-15/16) will be required.

In 3GPP New Radio ("NR"), the DM-RS is used by the receiver for radio channel estimation and for demodulation of an associated physical channel. On the uplink, the base station (e.g., gNB) receives the Physical Uplink Shared Channel ("PUSCH") and/or the Physical Uplink Control Channel ("PUCCH"), each of which contain DM-RS. On the downlink, the remote unit (e.g., UE) receives the Physical Downlink Shared Channel ("PDSCH") and/or the Physical Downlink Control Channel ("PDCCH"), each of which contain DM-RS. Note that the Physical Broadcast Channel ("PBCH")—used by the base station to broadcast the Synchronization Signal Block ("SSB")—may also contain DM-RS.

BRIEF SUMMARY

Disclosed are procedures for DM-RS configuration for enhancing channel estimation at high subcarrier spacing ("SCS"). Said procedures may be implemented by apparatus, systems, methods, or computer program products.

One method of a User Equipment ("UE") includes receiving a first indication of a configuration for Demodulation Reference Signal ("DM-RS"), the DM-RS configuration including a plurality of DM-RS configuration types. The method includes receiving a second indication to autonomously switch among the plurality of DM-RS configuration types based on a configured SCS value. The method includes performing a single channel estimation from multiple indicated antenna ports using the DM-RS.

One method of a Radio Access Network ("RAN") node includes determining a configuration for DM-RS, where the DM-RS configuration includes a plurality of DM-RS configuration types. The second method includes transmitting, to a UE, a first indication of the DM-RS configuration. The second method includes transmitting, to the UE, a second indication to autonomously switch among the plurality of DM-RS configuration types based on a configured SCS value for a channel. The second method further includes transmitting, to the UE, DM-RS on a shared channel according to the DM-RS configuration, the shared channel being one of: a Physical Downlink Shared Channel ("PDSCH") and a Physical Uplink Shared Channel ("PUSCH").

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
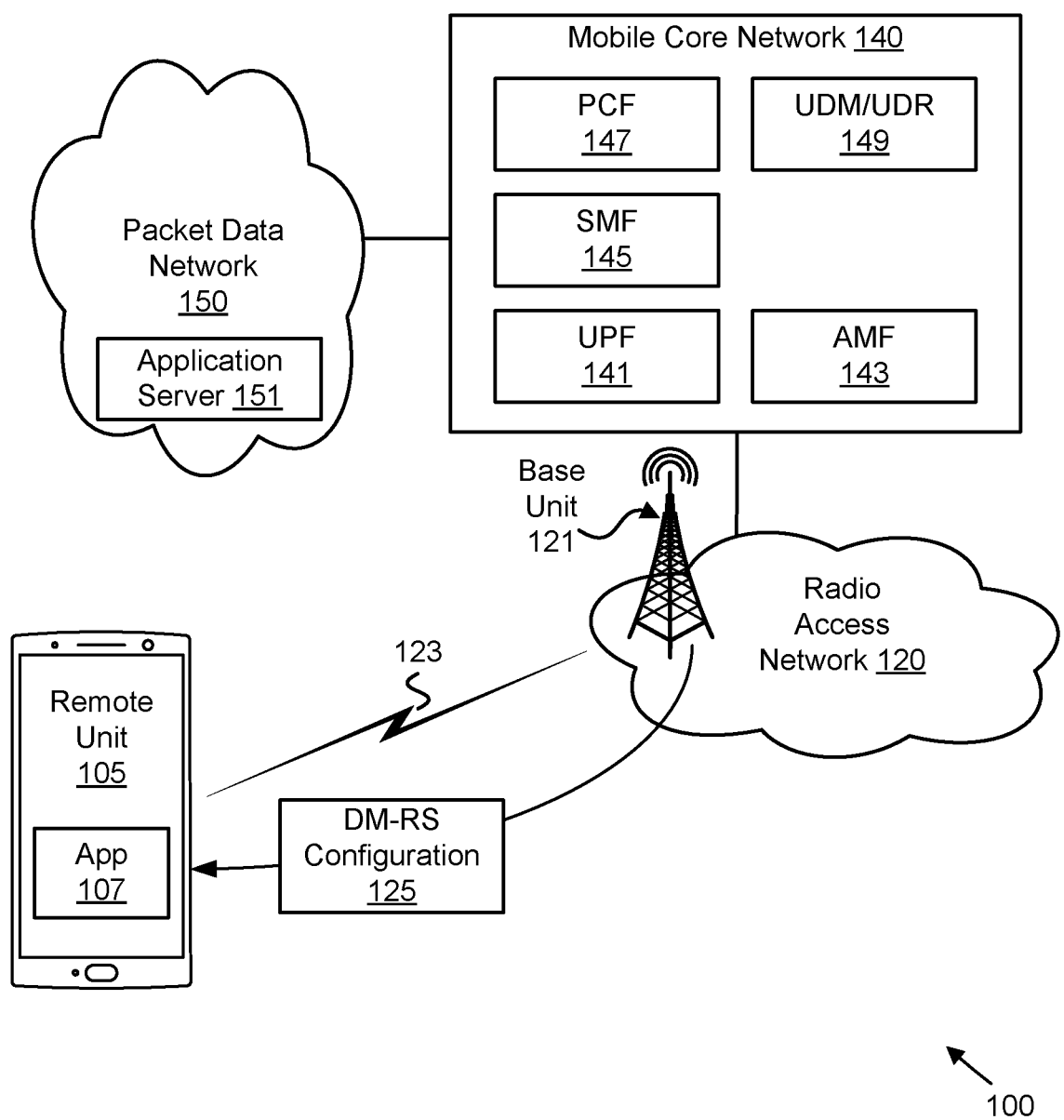
FIG. 1A is a schematic block diagram illustrating one embodiment of a wireless communication system for enhanced DM-RS configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for DM-RS configuration for enhancing channel estimation at high subcarrier spacing ("SCS"). For operation at radio frequencies beyond 52.6 GHz, higher SCS (i.e., higher than those supported in Rel-15/16 for frequencies below 52.6 GHz) may be used to provide better robustness against phase noise. Adopting high SCS is seen as a straightforward solution for reducing the effect of Intercarrier Interference ("ICI") caused by phase noise, since the amount of the interfered energy from the neighbor carriers' side loops is reduced as the carriers are apart from each other. However, adopting high SCS, e.g., higher than 240 KHz has an impact on the system performance such as the high probability of Inter-Symbol Interference ("ISI") due to the short Orthogonal Frequency Division Multiplexing ("OFDM") symbols (e.g., smaller cyclic prefix length) and the reduced channel estimation performance specially for frequency selective channels when the channel coherence bandwidth is less than the DR-MS spacing.

Disclosed herein are solutions that address the problems of higher subcarrier spacing ("SCS"), thereby enhancing the channel estimation performance. In 3GPP New Radio ("NR"), a front-loaded DM-RS structure is used as a baseline to achieve low-latency decoding. In the time-frequency resource grid, the front-loaded DM-RS can be located just after the control region, followed by data region. As soon as channel is estimated based on the front-loaded DM-RS, the receiver can coherently demodulate data in the data region.

The front-loaded DM-RS structure is particularly advantageous in decoding-latency reduction for low-mobility scenarios where channel coherence time is longer than the duration of the front-loaded DM-RS. However, allocating only the front-loaded DM-RS can degrade the link performance at higher UE speeds (i.e., channel coherence time becomes shorter). Although the channel information in the data region can be obtained by interpolation, the channel information accuracy diminishes with higher mobility. Therefore, the present disclosure considers the front-loaded DM-RS patterns with and time-domain densities.

A 'front-loaded DM-RS' refers to the first symbol(s) that carries DM-RS. If configured, the other DM-RS symbols are referred to as DM-RS additional positions, which can vary from 1 to 3 positions for single symbol DM-RS and 1 to 2 additional positions for double symbol DM-RS. In some embodiments, the DM-RS is UE-specific.

To support high-speed/high-mobility scenarios, it is possible to configure up to three additional DM-RS occasions in a slot, in order to track fast changes in channel. The channel estimation in the receiver side can use these additional reference signals for more accurate channel estimation, for example, to perform interpolation between the DM-RS occasions within a slot.

For high-speed scenarios, the time density of DM-RS is increased to track fast changes in the radio channel. The NR defines two time-domain DM-RS structures which differ in the location of the first DM-RS symbol:

For mapping Type A, the first DM-RS is in the second and the third symbol of the slot. Here, the DM-RS is mapped relative to the start of the slot boundary, regardless of where in the slot the actual data transmission occurs. The mapping Type A is primarily intended for the case where data is to occupy a substantial portion (e.g., all or nearly all) of a slot. The reason for the use of the second or the third symbol in the downlink slot is to locate the first DM-RS occasion after a Control Resource Set ("CORESET") that is positioned at the beginning of a slot.

For mapping Type B, the first DM-RS is positioned in the first symbol of the data allocation. Here, the DM-RS location is not given relative to the slot boundary, rather relative to where the data are located. The mapping Type B is intended for transmissions over a small fraction of the slot (e.g., less than half of the slot), for example, to support very low latency and other transmissions that cannot wait until a slot boundary starts regardless of the transmission duration.

In various embodiments, the mapping type for Physical Downlink Shared Channel ("PDSCH") transmission may be dynamically signaled as part of the downlink control information ("DCI"), while for the Physical Uplink Shared Channel ("PUSCH") the mapping type may be semi-statically configured.

The different time-domain locations for, e.g., PDSCH, DM-RS mapping types are single-symbol and double-symbol DM-RS patterns. The purpose of the double-symbol DM-RS is primarily to provide a larger number of antenna ports than what is possible with a single-symbol structure as discussed later. Note that the time-domain location of the DM-RS depends on the scheduled data duration. Multiple orthogonal reference signals can be generated in each DM-RS occasion. Different DM-RS patterns may be configured which are separated in time, frequency, and code domains. Reference signals should preferably have small power variations in the frequency domain to allow a similar channel-estimation quality for all frequencies spanned by the reference signal.

To remedy the above problems, a new DM-RS configuration type is disclosed providing better channel estimation at high SCS. Basically, high frequency-density of the DM-RS mapping is proposed as a function of at least the SCS value.

The network switches to a high frequency-density configuration when the value of subcarrier spacing is above a certain threshold $\mu n$. The number of ports for DM-RS may be reduced to two or four depending on whether a single-symbol or double-symbol DM-RS is configured from the higher layers based on SCS and the waveform type. However, for high frequency transmission (e.g., radio transmission on frequencies of 52.6 GHz and above), the performance gain of high rank MIMO channels is limited and therefore the benefit of configuring high number of antenna ports for spatial multiplexing is expected to be low.

FIG. 1A depicts a wireless communication system 100 for enhanced DM-RS configuration, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1A, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the base unit(s) 121 may provide a cell operating using a first carrier frequency and/or a cell operating using a second frequency. Cells using the first carrier frequency may form a first frequency layer, while cells using the second carrier frequency may form a second frequency layer.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). Although specific numbers and types of network functions are depicted in FIG. 1A, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering to & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1A for ease of illustration, but their support is assumed. In various embodiments, a first set of set of network slices may be prioritized for use with a first carrier frequency, while a second set of network slices may be prioritized for use with a second carrier frequency. As discussed in greater detail below, the RAN 120 sends selection assistance information 125 to a remote unit 105 (i.e., sent via the base unit 121) so that the remote unit 105 selects a specific combination of frequency layer (i.e., operating carrier frequency) and preferred network slice.

While FIG. 1A depicts components of a 5G RAN and a 5G core network, the described embodiments for performing enhanced DM-RS configuration apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting enhanced DM-RS configuration.

Figure 1B:
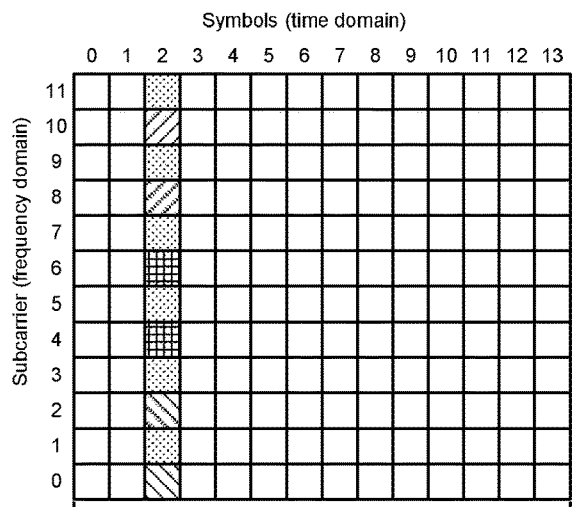
FIG. 1B is a diagram illustrating exemplary patterns of DM-RS configuration Type-1.
Figure 1B:
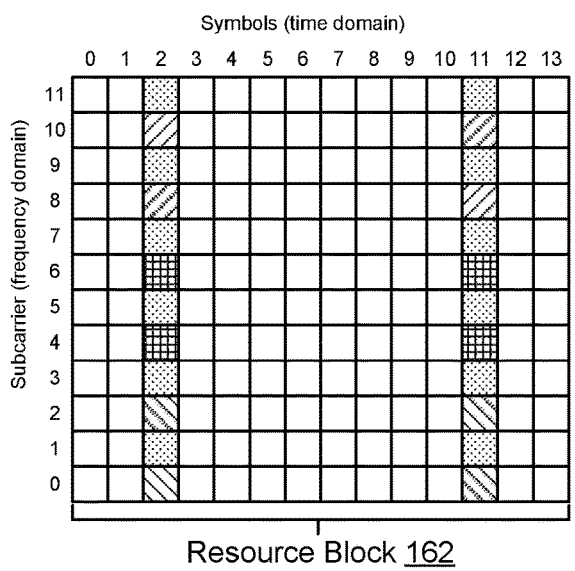
Figure 1B:
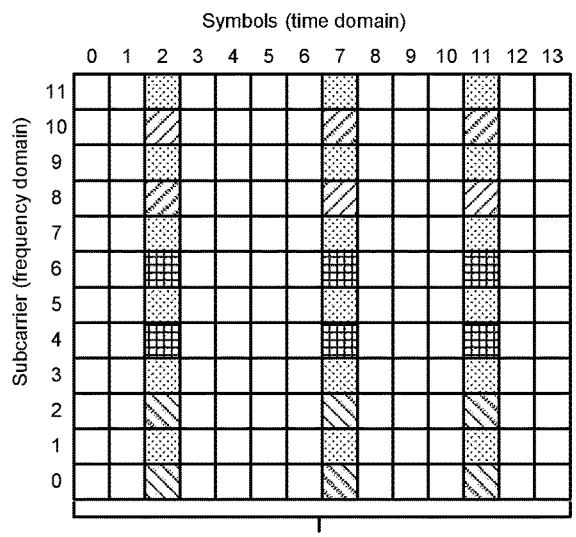
Figure 1B:
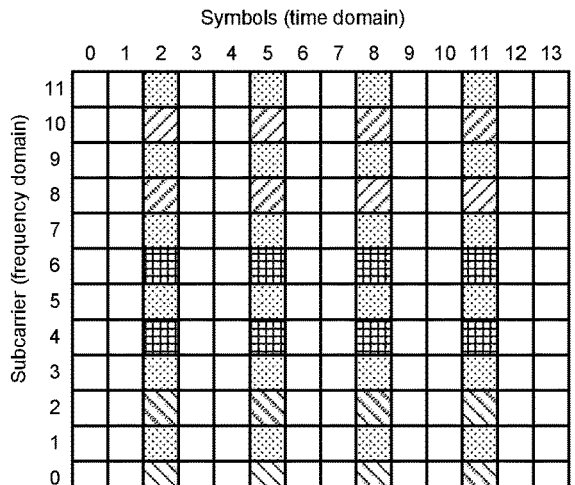
Figure 1B:
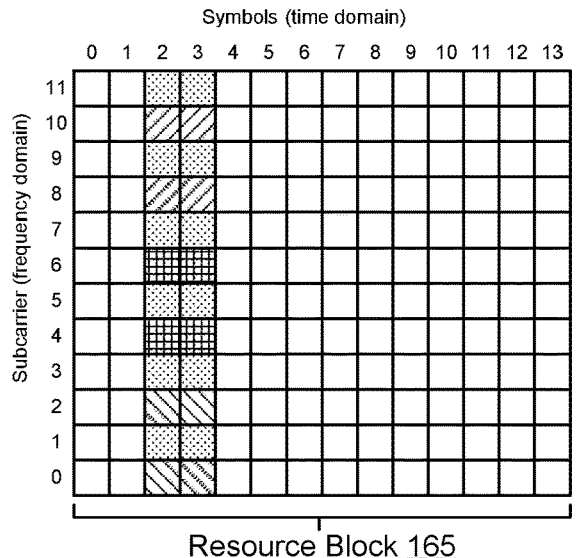
Figure 1C:
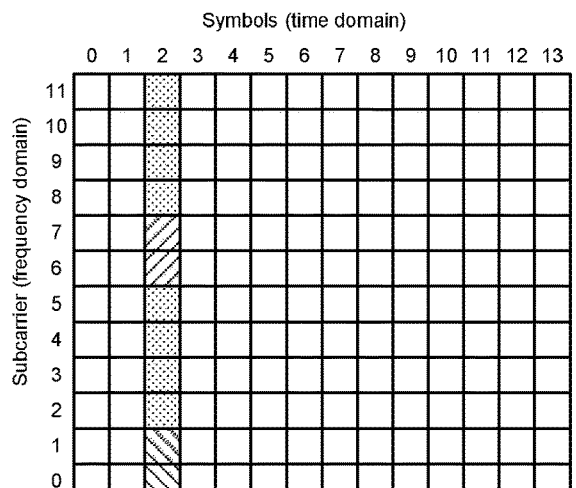
FIG. 1C is a diagram illustrating exemplary patterns of DM-RS configuration Type-2.
Figure 1C:
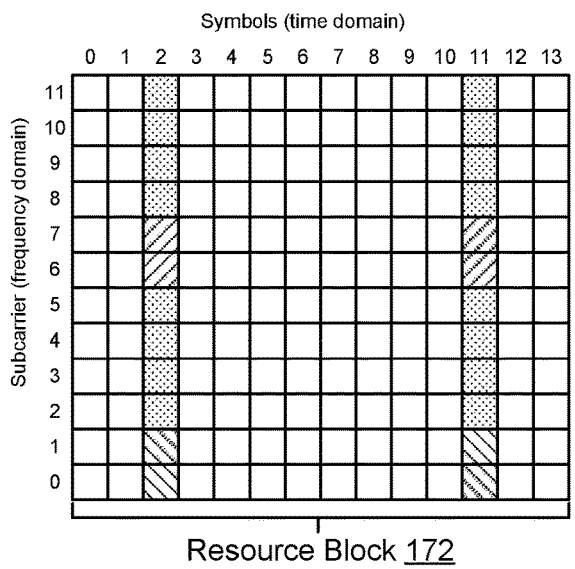
Figure 1C:
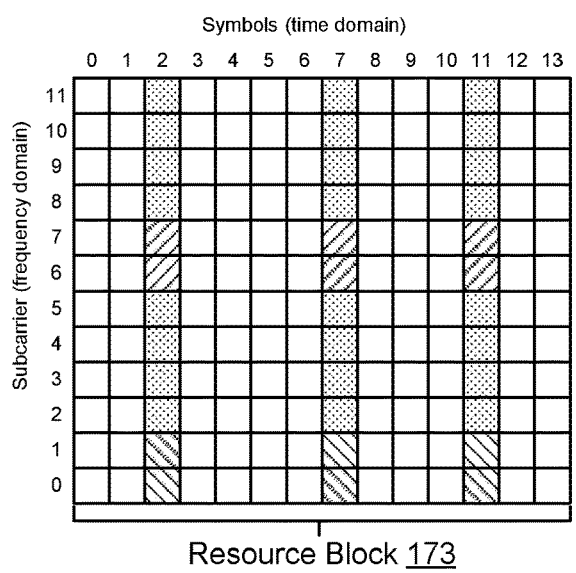
Figure 1C:
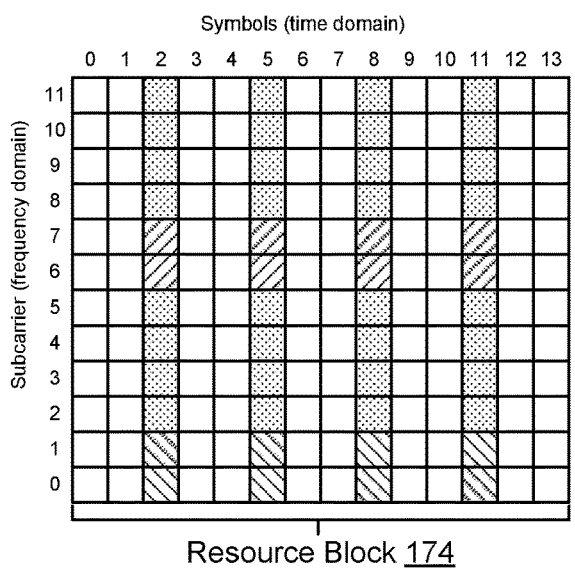
Figure 1C:
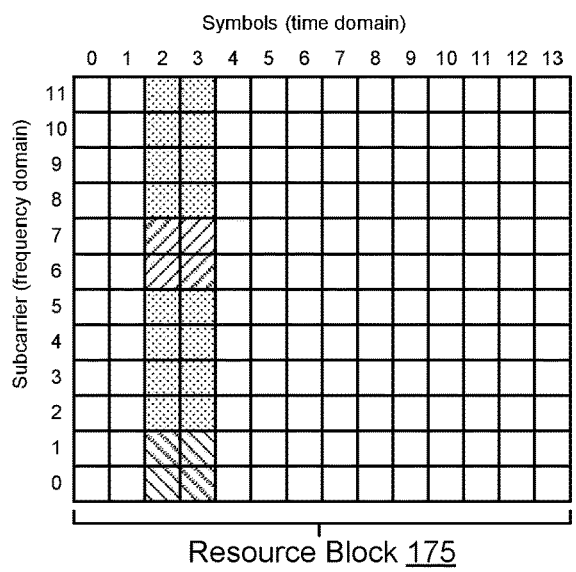

FIGS. 1B and 1C depicts examples of DM-RS configuration types and patterns in NR. The depicted examples show two types of DM-RS configuration (i.e., Type-1 and Type-2) which are distinguished in frequency-domain mapping and the maximum number of orthogonal reference signals. These configuration types differ in the DM-RS location in the frequency domain.

DM-RS Type-1 can provide up to four (4) orthogonal signals (i.e., DM-RS ports) using a single-symbol DM-RS and up to eight (8) orthogonal reference signals using a double-symbol DM-RS. For the case of single-symbol DM-RS (i.e., where DM-RS length is equal to one symbol in time), configuration Type-1 supports DM-RS ports 1000 to 1003. For the case of double-symbol DM-RS (i.e., where DM-RS length is equal to two symbols in time), configuration Type-1 supports DM-RS ports 1000 to 1007.

In contrast, DM-RS Type-2 may provide up to six (6) orthogonal signals using a single-symbol DM-RS and up to twelve (12) orthogonal reference signals using a double-symbol DM-RS. For the case of single-symbol DM-RS (i.e., where DM-RS length is equal to one symbol in time), configuration Type-2 supports DM-RS ports 1000 to 1005. For the case of double-symbol DM-RS (i.e., where DM-RS length is equal to two symbols in time), configuration Type-2 supports DM-RS ports 1000 to 1011.

Note that DM-RS Types 1 and 2 should not be confused with the mapping Type A or B, because different mapping types can be combined with different reference signal types.

FIG. 1B depicts examples various DM-RS structures of DM-RS configuration Type-1, according to embodiment of the disclosure. The configuration Type-1 has 3 pairs (i.e., 6 occupied REs) of DM-RS which are dispersed at the interval of 4 REs (i.e., '4n'). The two RE in each pair are apart at the interval of 2 RE. Accordingly, the 6 REs of DM-RS symbols are dispersed at every other REs in frequency domain, with non-DM-RS REs located between the DM-RS REs.

In the depicted embodiment, the first pair of DM-RS occupies subcarriers 0 and 2, the second pair of DM-RS occupies subcarriers 4 and 6, and the third pair of DM-RS occupies subcarriers 8 and 10. However, in other embodiments, the first pair of DM-RS occupies subcarriers 1 and 3, the second pair of DM-RS occupies subcarriers 5 and 7, and the third pair of DM-RS occupies subcarriers 9 and 11. While FIG. 1B shows empty REs (i.e., no signal transmission) between the DM-RS REs in the DM-RS symbol(s), in other embodiments the non-DM-RS REs in the DM-RS symbol(s) may be data REs (i.e., occupied with data signal). Note that FIG. 1B does not show the different DM-RS ports for configuration Type-1.

Resource block ("RB") 161 shows a Type-1 single-symbol DM-RS structure with no additional symbols, the RB consisting of 12 subcarriers over 14 symbols (i.e., 1 slot). Note that a Resource Element ("RE") refers to the combination of one subcarrier and one symbol. In RB 161, the REs carrying DM-RS (referred to as "DM-RS REs") are on symbol 2.

RB 162 shows a Type-1 single-symbol DM-RS structure with one additional symbol. In RB 162, the REs carrying DM-RS (referred to as "DM-RS REs") are on symbols 2 and 11. RB 163 shows a Type-1 single-symbol DM-RS structure with two additional symbols. In RB 163, the REs carrying DM-RS (referred to as "DM-RS REs") are on symbols 2, 7 and 11.

RB 164 shows a Type-1 single-symbol DM-RS structure with three additional symbols. In RB 164, the REs carrying DM-RS (referred to as "DM-RS REs") are on symbols 2, 5, 8 and 11. RB 165 shows a Type-1 double-symbol DM-RS structure with no additional symbols. In RB 165, the REs carrying DM-RS (referred to as "DM-RS REs") are on symbols 2 and 3.

FIG. 1C depicts examples various DM-RS structures of DM-RS configuration Type-2, according to embodiment of the disclosure. The configuration Type-2 has 2 pairs (i.e., 4 occupied REs) of DM-RS which are dispersed at the interval of 6 REs (i.e., '6n'). The two RE in each pair are contiguous, i.e., adjacent in frequency domain. Accordingly, the 4 REs of DM-RS symbols are dispersed at every other REs in frequency domain, with non-DM-RS REs between the DM-RS REs.

In the depicted embodiment, the first pair of DM-RS occupies subcarriers 0 and 1, while the second pair of DM-RS occupies subcarriers 6 and 7. However, in a first alternative, the first pair of DM-RS occupies subcarriers 2 and 3, while the second pair of DM-RS occupies subcarriers 8 and 9. In a second alternative, the first pair of DM-RS occupies subcarriers 4 and 5, while the second pair of DM-RS occupies subcarriers 10 and 11. While FIG. 1C shows empty REs (i.e., no signal transmission) between the DM-RS REs in the DM-RS symbol(s), in other embodiments the non-DM-RS REs in the DM-RS symbol(s) may be data REs (i.e., occupied with data signal). Note that FIG. 1C does not show the different DM-RS ports for configuration Type-2.

Resource block ("RB") 171 shows a Type-2 single-symbol DM-RS structure with no additional symbols, the RB consisting of 12 subcarriers over 14 symbols (i.e., 1 slot). In RB 171, the REs carrying DM-RS (referred to as "DM-RS REs") are on symbol 2.

RB 172 shows a Type-2 single-symbol DM-RS structure with one additional symbol. In RB 172, the REs carrying DM-RS (referred to as "DM-RS REs") are on symbols 2 and 11. RB 173 shows a Type-2 single-symbol DM-RS structure with two additional symbols. In RB 173, the REs carrying DM-RS (referred to as "DM-RS REs") are on symbols 2, 7 and 11.

RB 174 shows a Type-2 single-symbol DM-RS structure with three additional symbols. In RB 174, the REs carrying DM-RS (referred to as "DM-RS REs") are on symbols 2, 5, 8 and 11. RB 175 shows a Type-2 double-symbol DM-RS structure with no additional symbols. In RB 175, the REs carrying DM-RS (referred to as "DM-RS REs") are on symbols 2 and 3.

Figure 2:
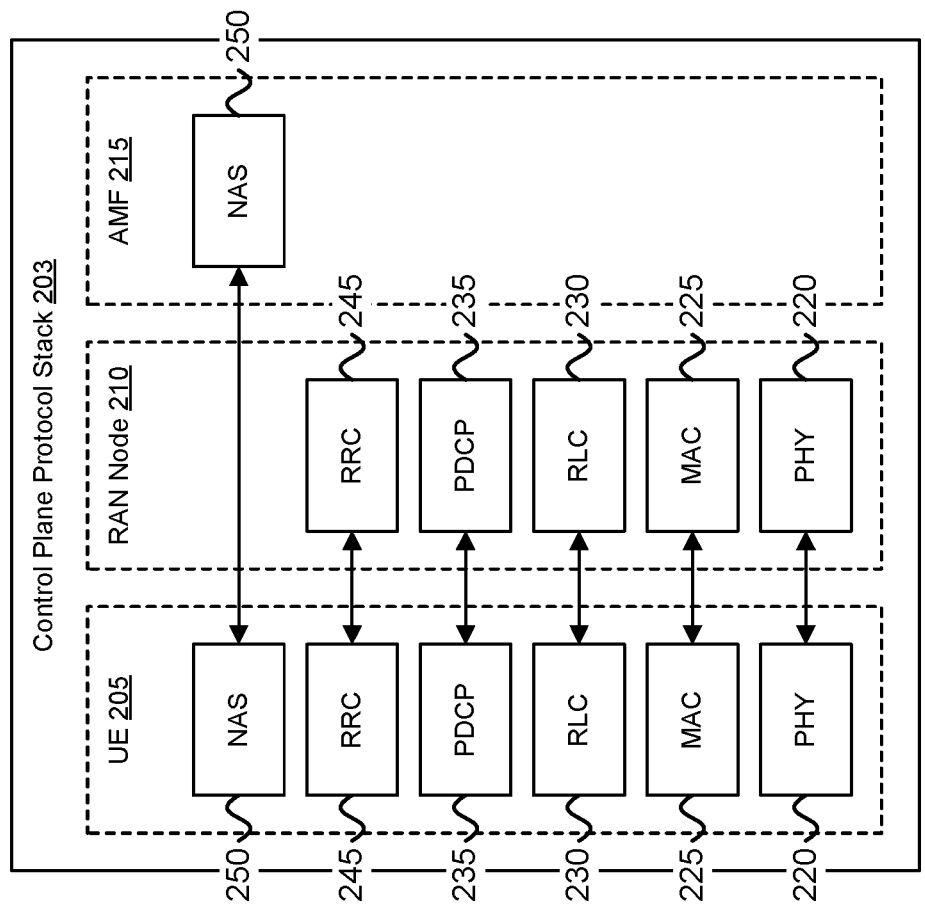
FIG. 2 is a block diagram illustrating one embodiment of a 5G New Radio ("NR") protocol stack.
Figure 2:
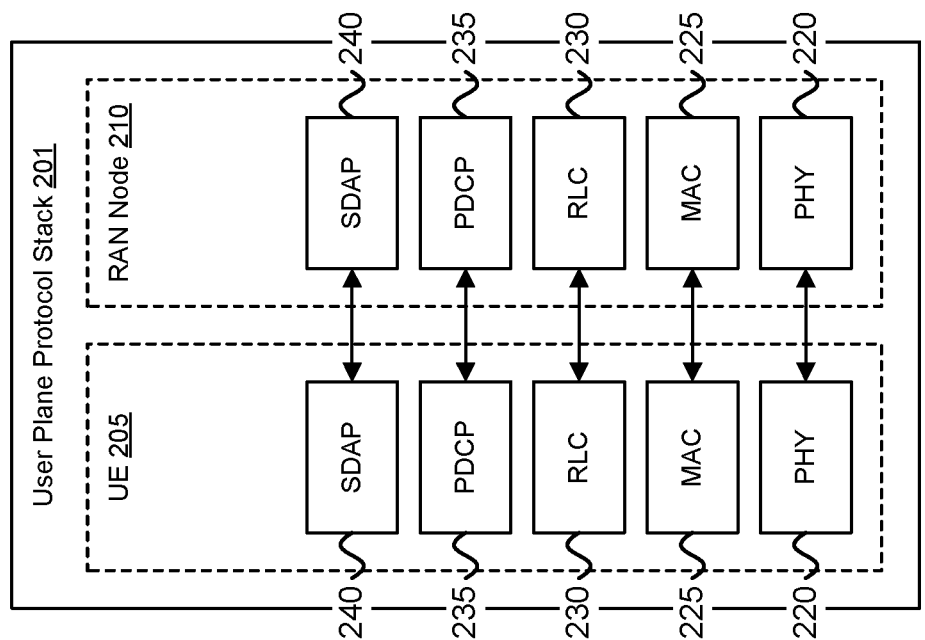

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

Figure 3:
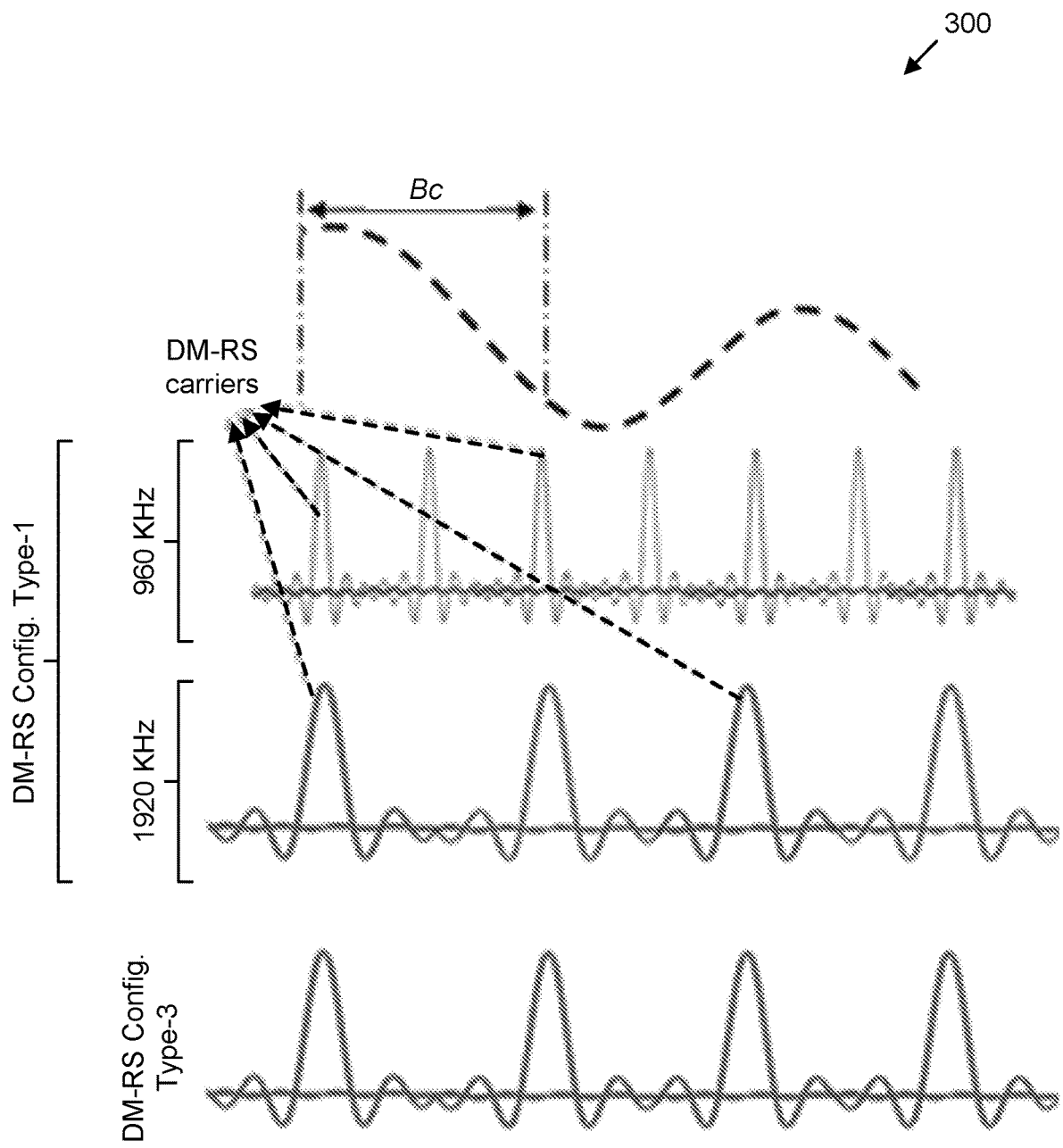
FIG. 3 is a diagram illustrating one embodiment of DM-RS spacing and SCS in relation to the coherence bandwidth.

FIG. 3 depicts a comparison 300 of DM-RS spacing and SCS in relation to the coherence bandwidth, according to embodiments of the disclosure.

As discussed above, the network (i.e., RAN) switches to the new DM-RS configuration when the value of subcarrier spacing is above a certain threshold μn. The number of ports for DM-RS will be reduced to two or four depending on whether a single-symbol or double-symbol DM-RS is configured from the higher layers based on SCS and the waveform type. However, for high frequency transmission, the performance gain of high rank MIMO channels is limited and therefore the benefit of configuring high number of antenna ports for spatial multiplexing is expected to be low.

A key benefit of the below described solutions is to exploit the high-density frequency domain mapping of DM-RS for better channel estimation when the channel coherence bandwidth $B_c$ is less than the configured DM-RS RE spacing, e.g., in case of outdoor scenarios.

For example, a channel with 100 ns RMS delay spread exhibits a coherence bandwidth (above 50% correlation) of ~2 MHz. A system with configured SCS of 1.92 MHz performs channel estimation with DM-RS spacing of 3.84 MHz (in case of DM-RS configuration Type-1). That is larger than the channel coherence bandwidth which leads to a poor channel estimation performance. Mapping DM-RS to every RE, leads to a spacing of 1.92 MHz, and hence enhances the channel estimation.

According to embodiments of a first solution, an enhanced DM-RS configuration, referred to as configuration Type-3, is proposed for PDSCH/PUSCH, to support channel estimation and demodulation at high frequencies (e.g., 52.6 GHz and above). In DM-RS configuration Type-3, DM-RS structure is proposed with contiguous allocation in frequency domain occupying all the subcarriers in the entire bandwidth allocated to corresponding channel such as PDSCH/PUSCH on a given time symbol. The first starting symbol used for DM-RS is mapped in a slot according to current specifications, depending upon different parameters such as PDSCH/PUSCH mapping type. Also, this new DM-RS configuration type is applicable to CP-OFDM, DFT-s-OFDM or any other single carrier or multicarrier waveform.

In one example implementation of the first solution, 12 Resource Elements of DM-RS are mapped in frequency domain at every RE in one OFDM symbol/one RB with no interval between the DM-RS REs (1k'). The UE assumes the DM-RS sequence r(m) are mapped to resource elements $(k,l)_{p,\mu}$ (with symbols as defined in TS 38.211) according to $$a_{k,l}^{(p,\mu)} = \beta_{PDSCH}^{DMRS} w_f(k') w_t(l') r(2n + k')$$

$$k = \begin{cases} 4n + 2k' + \Delta & \text{Configuration Type-1} \\ 6n + k' + \Delta & \text{Configuration Type-2} \\ 2n + k' + \Delta & \text{Configuration Type-3} \end{cases}$$

$$k' = 0, 1$$

$$l = \bar{l} + l'$$

$$n = 0, 1, \ldots$$

Figures 4A, 4B:
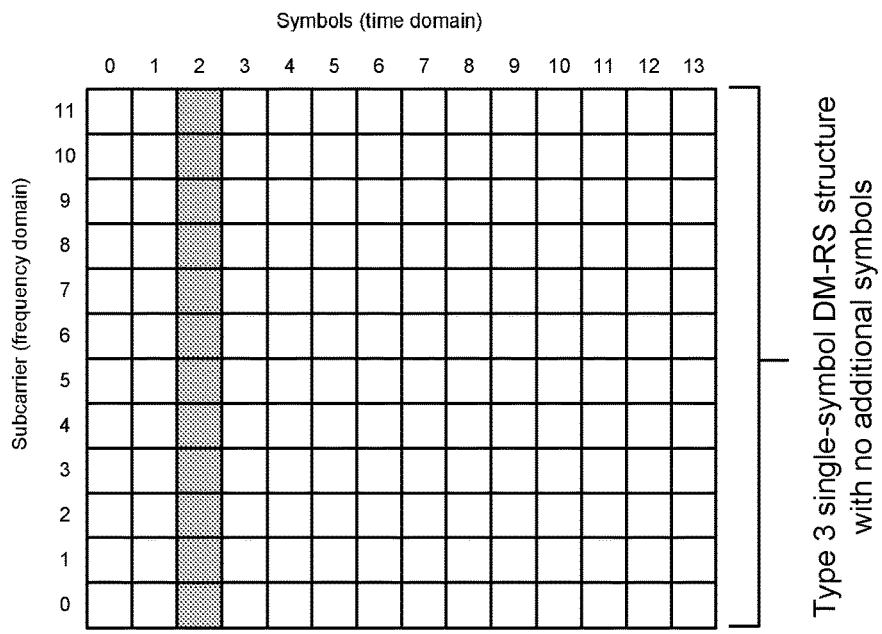
FIG. 4A is a diagram illustrating one embodiment of DM-RS structure of DM-RS configuration Type-3.
FIG. 4B is a diagram illustrating one embodiment of antenna ports for DM-RS configuration Type-3.

FIGS. 4A-4B depicts an example of enhanced DM-RS configuration Type-3 and the supported antenna ports, according to embodiments of the disclosure.

FIG. 4A depicts an example DM-RS structure of DM-RS configuration Type-3, according to embodiment of the disclosure. Here, all REs of the DM-RS symbol are occupied with DM-RS for enhanced channel estimation, as described above. In the depicted RB (i.e., 12 subcarriers over 14 symbols), the DM-RS REs are on symbol 2. In some embodiments, the UE 205 autonomously switches to DM-RS configuration Type-3 when the value of subcarrier spacing is above a certain threshold, e.g., μn.

FIG. 4B depicts examples of supported antenna ports for DM-RS configuration Type-3. In FIG. 4B, an example of Orthogonal Cover Code ("OCC") in time only (for 1-symbol DM-RS) and OCC in time-frequency (for 2-symbol DM-RS) is illustrated. With OCC applied, the configuration supports 4 DM-RS ports in case of double-symbol DM-RS and 2 DM-RS ports in case of single symbol DM-RS.

Thus, DM-RS Type-3 can provide two (2) orthogonal signals (i.e., DM-RS ports) using a single-symbol DM-RS and up to four (4) orthogonal reference signals using a double-symbol DM-RS. For the case of single-symbol DM-RS (i.e., where DM-RS length is equal to one symbol in time), configuration Type-3 supports DM-RS ports 1000 and 1001. For the case of double-symbol DM-RS (i.e., where DM-RS length is equal to two symbols in time), configuration Type-3 supports DM-RS ports 1000 to 1003.

Table 1 shows the parameters for PDSCH DM-RS configuration Type-3.

TABLE 1

Example parameters for PDSCH DM-RS configuration Type-3

| p | CDM group | Δ | $w_f(k')$, k' = 0 | k' = 1 | $w_t(l')$, l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 0 | 0 | +1 | +1 | +1 | −1 |
| 1003 | 0 | 0 | +1 | −1 | +1 | −1 |

Table 2 shows how many DM-RS antenna ports can be used for different DM-RS configurations including configuration Type-3. As shown in the table, for configuration Type-3 when DM-RS symbol length is 1, maximum 2 DM-RS antenna ports can be used, and max 4 DM-RS ports can be used when the DM-RS symbol length is 2.

TABLE 2

Example of supported DM-RS antenna ports for different DM-RS configuration types

| Single or double symbol DM-RS | l' | Supported antenna ports p | | |
|---|---|---|---|---|
| | | SCS < $\mu_n$ | | SCS >= $\mu_n$ |
| | | Configuration Type-1 | Configuration Type-2 | Configuration Type-3 |
| single | 0 | 1000-1003 | 1000-1005 | 1000-1001 |
| double | 0, 1 | 1000-1007 | 1000-1011 | 1000-1003 |

Furthermore, Table 3 and Table 4 below shows examples of DM-RS port indication table for DM-RS configuration Type-3 for 1-symbol and 2-symbol length, respectively. According to this example illustration of DM-RS configuration Type-3, a single DM-RS CDM group 0 can be defined where CDM group 0 can contain two DM-RS ports 1000-10001 for 1-symbol DM-RS length and four DM-RS ports 1000-1003 for 2-symbol DM-RS length. All the ports within this single DM-RS group can be assumed to be quasi co-located ("QCL-ed").

Although, Table 3 and Table 4 shows the column 2 for indicating rate-matching around indicated DM-RS ports, but it is not essential for the example illustration as there is only single CDM group and no data multiplexing is allowed with DM-RS on a given symbol. Therefore, other possibility for DM-RS port indication table could be to remove the column indicating number of DM-RS CDM groups without data, as it will always be 1 for such DM-RS configuration type. The size of the table can further be reduced depending upon the supported rank for PDSCH/PUSCH.

For example, only if rank1 transmission is supported for PUSCH, then the table can be limited to only single port indication. Other combinations can also be considered. Even smaller or larger tables can be considered depending upon the desired DCI overhead for indicating the index of these tables.

TABLE 3

Example table for antenna port(s) (1000 + DM-RS port), dmrs-Type = 3, maxLength = 1

| Value | Number of DM-RS CDM group(s) without data | DM-RS port(s) | Number of front-load symbols |
|---|---|---|---|
| 0 | 1 | 0 | 1 |
| 1 | 1 | 1 | 1 |
| 2 | 1 | 0, 1 | 1 |
| 3 | Reserved | Reserved | Reserved |

TABLE 4

Example table for antenna port(s) (1000 + DM-RS port), dmrs-Type = 3, maxLength = 2

| Value | Number of DM-RS CDM group(s) without data | DM-RS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 1 | 2 | 2 |
| 4 | 1 | 3 | 2 |
| 5 | 1 | 2, 3 | 2 |
| 6 | 1 | 0-2 | 2 |
| 7 | 1 | 0-3 | 2 |
| 8 | 1 | 0, 2 | 2 |
| 9 | 1 | 0 | 2 |
| 10 | 1 | 1 | 2 |
| 11 | 1 | 0, 1 | 2 |
| 12 | 1 | 0, 2 | 2 |
| 13 | 1 | 0, 3 | 2 |
| 14 | 1 | 1, 2 | 2 |
| 15 | 1 | 1, 3 | 2 |

In another example implementation of the first solution, 12 Resource Elements of DM-RS are mapped in frequency domain at every RE in one OFDM symbol/one Resource Block ("RB") with no interval between the DM-RS REs (1k'), where OCC in frequency are applied to accommodate 2 orthogonal DM-RS ports using 1-symbol length (e.g., half-symbol cyclic shift in time domain to the DM-RS sequence for the second DM-RS port corresponding to applying a phase ramp in frequency of pi*k or equivalently a +1, −1, +1, −1 . . . . sequence multiplying the DM-RS sequence in frequency domain). For accommodating more than 2 ports, 2-symbol DM-RS length can be utilized, where the DM-RS ports on the second symbol are Time-Division Multiplexed. So basically, a combination of Orthogonal Cover Code ("OCC") in frequency and Time-Division Multiplexing ("TDM"). The OCC in the two symbols could be either same or different (for example as shown in Table 1) as they are orthogonal in time.

Table 5 and Table 6 below show examples of DM-RS port indication table for DM-RS configuration Type-3 for 1-symbol with FD-OCC and 2-symbol length with FD-OCC+TDM, respectively. According to this example illustration of DM-RS configuration Type-3, a single DM-RS CDM group 0 can be defined where CDM group 0 can contain two DM-RS ports 1000-1001 for 1-symbol DM-RS length and two DM-RS CDM groups 0 and 1 with four DM-RS ports 1000-1003 for 2-symbol DM-RS length, where CDM group 0 contains DM-RS ports 1000-1001 and CDM group 1 contains DM-RS ports 1002-1003. All the ports within a single DM-RS group can be assumed to be QCL-ed. The size of the table can further be reduced depending upon the supported rank for PDSCH/PUSCH. For example, only if rank1 transmission is supported for PUSCH, then the table can be limited to only single port indication. Other combinations can also be considered. Even smaller or larger tables can be considered depending upon the desired DCI overhead for indicating the index of these tables.

TABLE 5

Example table of antenna port(s) (1000 + DM-RS port), dmrs-Type = 3, maxLength = 1

| Value | Number of DM-RS CDM group(s) without data | DM-RS port(s) | Number of front-load symbols |
|---|---|---|---|
| 0 | 1 | 0 | 1 |
| 1 | 1 | 1 | 1 |
| 2 | 1 | 0, 1 | 1 |
| 3 | Reserved | Reserved | Reserved |

TABLE 6

Example table of antenna port(s) (1000 + DM-RS port), dmrs-Type = 3, maxLength = 2

| Value | Number of DM-RS CDM group(s) without data | DM-RS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 2 | 2 | 2 |
| 4 | 2 | 3 | 2 |
| 5 | 2 | 2, 3 | 2 |
| 6 | 2 | 0-2 | 2 |
| 7 | 2 | 0-3 | 2 |
| 8 | 2 | 0, 2 | 2 |
| 9 | 2 | 0, 3 | 2 |
| 10 | 2 | 1, 2 | 2 |
| 11 | 2 | 1, 3 | 2 |
| 12 | 1 | 2 | 2 |
| 13 | 1 | 3 | 2 |
| 14 | 1 | 2, 3 | 2 |
| 15 | Reserved | Reserved | Reserved |

Note that for Table 6, for values 0, 1, and 2 only the first symbol is used, the second symbol is not used by any UE. For values 3, 4, and 5 only the second symbol is used for the signaled UE, but the first symbol is for another UE. For values 6, 7, 8, 9, 10, and 11 both symbols are used (at least partially) for the signaled UE. For values 12, 13, and 14 only the second symbol is used, the first symbol is not used by any UE.

According to embodiments of a second solution, to achieve high frequency-density of DM-RS for enhancing the channel estimation, the existing DM-RS types (i.e., DM-RS configuration Type-1 and/or DM-RS configuration Type-2) are used with configuration indication of the relation/linking between different antenna ports via high-layer signaling (e.g., RRC) or DCI e.g., codepoint in antenna port(s) indication.

The UE is indicated that some antenna ports from one CDM group are linked/grouped with antenna ports from another CDM group (e.g., one antenna port from each of the CDM groups are grouped/linked) such that the channel over which a symbol on any antenna port in a set S (comprising the antenna ports that are linked/grouped) can be inferred from the channel over which another symbol on any of the antenna ports in set S is conveyed. Thus, the antenna ports in the set S which are grouped/linked can be considered to form a single equivalent or composite antenna port with reduced DM-RS RE spacing in frequency which can result in improved channel estimation. In one example, the DM-RS would be transmitted from the same (virtualized) antenna (e.g., same spatial transmission filter) for all antenna ports in set S. UE implementations can use DM-REs corresponding to grouped antenna ports in set S to perform a single channel estimation.

As an example, a UE configured with DM-RS configuration Type-2 and one DM-RS symbol length, there may be three CDM groups $\{0, 1, 2\}$, with each CDM group comprising two antenna ports. In certain embodiments, CDM group 0 comprises antenna ports $\{\mathbf{1000, 1001}\}$, CDM group 1 comprising antenna ports $\{\mathbf{1002, 1003}\}$, and CDM group 2 comprises antenna ports $\{\mathbf{1004, 1005}\}$. The UE is indicated that the even/odd antenna ports in CDM groups $\{\mathbf{0, 1, 2}\}$ are linked/grouped together (one antenna port from each of the CDM groups are grouped/linked). Thus, the antenna ports in the set S are linked (i.e., grouped) together to form a single equivalent/composite antenna port with higher frequency-density than provided by conventional DM-RS configuration Type-2, where S=1000+$\{0, 2, 4\}$ or 1000+$\{1, 3, 5\}$ for 1-symbol DM-RS length.

The UE may assume when antenna port $\{\mathbf{0}\}$ in first CDM group (i.e., CDM group 0) is indicated, then linked antenna port $\{\mathbf{2}\}$ in the second CDM group (i.e., CDM group 1) and linked antenna port $\{\mathbf{4}\}$ in the third CDM group (CDM group 2) are also transmitted. Additionally, the UE may assume that when antenna port $\{\mathbf{1}\}$ in first CDM group (i.e., CDM group 0) is indicated, then linked antenna port $\{\mathbf{3}\}$ in the second CDM group (i.e., CDM group 1) and linked antenna port $\{\mathbf{5}\}$ in the third CDM group (i.e., CDM group 2) are also transmitted. In one example, the antenna ports in two different set S can be assumed to be QCL-ed.

Table 9 shows examples of DM-RS indication table for DM-RS configuration Type-2 with single DM-RS symbol in case of grouping/linking the antenna ports is used. In Table 9, the full symbol DM-RS with antenna port grouping/linking is indicated in the reserved codepoints values (24-26) of Rel-16 type-2 antenna port indication table with the other values corresponding to Rel-16 mapping/behavior.

Similar linking can be done with DM-RS configuration Type-1. As an example, for a UE configured with DM-RS configuration Type-1 and one DM-RS symbol length, there may be two CDM groups $\{0, 1\}$, with each CDM group comprising two antenna ports. In certain embodiments, CDM group 0 comprises antenna ports $\{\mathbf{1000, 1001}\}$ and CDM group 1 comprises antenna ports $\{\mathbf{1002, 1003}\}$. The UE is indicated that the even/odd antenna ports in CDM groups $\{\mathbf{0, 1}\}$ are linked/grouped together (one antenna port from each of the CDM groups are grouped/linked). Thus, the antenna ports in the set S are linked (i.e., grouped) together to form a single equivalent/composite antenna port with higher frequency-density than provided by conventional DM-RS configuration Type-1, where S=1000+$\{0, 2\}$ or 1000+$\{1, 3\}$.

The UE may assume when antenna port $\{\mathbf{0}\}$ in first CDM group (i.e., CDM group 0) is indicated, then linked antenna port $\{\mathbf{2}\}$ in second CDM group (i.e., CDM group 1) is also transmitted. Additionally, the UE may assume when antenna port $\{\mathbf{1}\}$ in first CDM group (i.e., CDM group 0) is indicated, then linked antenna port $\{\mathbf{3}\}$ in second CDM group (i.e., CDM group 1) is also transmitted. In one example, $w_f$ (k') for DM-RS ports 1, 3 (or antenna ports 1001, 1003) can be changed to {+1 +1} and {−1 −1}. In one example, the antenna ports in two different set S can be assumed to be QCL-ed.

Tables 7 and 8 show examples of DM-RS indication table for DM-RS configuration Type-1 with single DM-RS symbol in case of linking the antenna ports is used.

When antenna port grouping/linking is configured, for 1 DM-RS CDM group without data, and for 2 DM-RS CDM group without data and more than 2 DM-RS ports, then one or more entries in the table can be invalid as in example Table 7. In one embodiment, the invalid entries are removed from the indication possibilities resulting in a smaller table needing fewer number of bits for antenna port indication. In another embodiment, signaling an invalid table entry indicates that the UE is to use the Rel-16 mapping/behavior without antenna port grouping/linking. In one example, the invalid or use Rel-16 mapping/behavior can be configured for the UE by higher layer signaling. The use of Re-16 mapping/behavior may be suitable in scenarios such as for low Modulation and Coding Scheme ("MCS") (e.g., low SINR conditions), or Line of Sight ("LOS") (High Ricean K factor) conditions with smaller channel rms delay spread.

Thus, the network may dynamically control the DM-RS overhead and switch between Rel-16 mapping/behavior and full symbol DM-RS with antenna port grouping/linking. In Table 8, the full symbol DM-RS with antenna port grouping/linking is indicated in the reserved codepoints values (13-15) of Rel-16 type-1 antenna port indication table with the other values corresponding to Rel-16 mapping/behavior.

Note, that similar tables can also be done for first solution with Type-3 configuration used instead of the entries with antenna port grouping/linking and Rel-16 mapping/behavior and interpretation for other cases. In one example, the Cyclic Prefix ("CP") duration is the same and does not change between Rel-16 mapping/behavior and antenna port grouping/linking or DM-RS configuration Type-3 entries.

In some embodiments, for 2-symbol DM-RS length with time-domain OCC or with TDM, additional antenna port sets can be formed to include the additional antenna ports with 2-symbol DM-RS length (e.g., one antenna port from each of the CDM groups are grouped/linked). For a UE configured with DM-RS configuration Type-2 with time-domain OCC, and two DM-RS symbol length, there may be three CDM groups {0, 1, 2}, with each CDM group comprising four antenna ports. In an example grouping, CDM group 0 may comprise antenna ports {1000, 1001, 1006, 1007}, CDM group 1 may comprise antenna ports {1002, 1003, 1008, 1009}, and CDM group 2 may comprise antenna ports {1004, 1005, 1010, 1011}. The antenna port grouping in set S can be S=1000+{0, 2, 4} or 1000+{1, 3, 5} or 1000+{6, 8, 10} or 1000+{7, 9, 11} resulting in up to 4 equivalent DM-RS ports.

For a UE configured with DM-RS configuration Type-1 with time-domain OCC, and two DM-RS symbol length, there may be two CDM groups {0, 1}, with each CDM group comprising four antenna ports-CDM group 0 comprising antenna ports {1000, 1001, 1004, 1005} and CDM group 1 comprising antenna ports {1002, 1003, 1006, 1007}. The antenna port grouping in set S can be S=1000+{0, 2} or 1000+{1, 3} or 1000+{4, 6} or 1000+{5, 7} resulting in up to 4 equivalent DM-RS ports.

TABLE 7

Example table of Antenna port(s) (1000 + DM-RS port), dmrs-Type = 1, maxLength = 1
One Codeword:
Codeword 0 enabled,
Codeword 1 disabled

| Value | Number of DM-RS CDM group(s) without data | Indicated DM-RS port(s) | Other Inferred DM-RS port(s) (with antenna port grouping) |
|---|---|---|---|
| 0 | 1 | 0 | Invalid or Rel-16 mapping |
| 1 | 1 | 1 | Invalid or Rel-16 mapping |
| 2 | 1 | 0, 1 | Invalid or Rel-16 mapping |
| 3 | 2 | 0 | 2 |
| 4 | 2 | 1 | 3 |
| 5 | 2 | 2 | 0 or Rel-16 mapping |
| 6 | 2 | 3 | 1 or Rel-16 mapping |
| 7 | 2 | 0, 1 | 2, 3 |
| 8 | 2 | 2, 3 | 0, 1 or Rel-16 mapping |
| 9 | 2 | 0-2 | Invalid or Rel-16 mapping |
| 10 | 2 | 0-3 | invalid or Rel-16 mapping |
| 11 | 2 | 0, 2 | invalid or Rel-16 mapping |
| 12 | 2 | 0, 2, 3 | invalid or Rel-16 mapping |
| 13-15 | Reserved | Reserved | |

TABLE 8

Example table of Antenna port(s) (1000 + DM-RS port), dmrs-Type = 1, maxLength = 1
One Codeword:
Codeword 0 enabled,
Codeword 1 disabled

| Value | Number of DM-RS CDM group(s) without data | Indicated DM-RS port(s) | Other Inferred DM-RS port(s) |
|---|---|---|---|
| 0 | 1 | 0 | — |
| 1 | 1 | 1 | — |
| 2 | 1 | 0, 1 | — |
| 3 | 2 | 0 | — |
| 4 | 2 | 1 | — |
| 5 | 2 | 2 | — |
| 6 | 2 | 3 | — |
| 7 | 2 | 0, 1 | — |
| 8 | 2 | 2, 3 | — |
| 9 | 2 | 0-2 | — |
| 10 | 2 | 0-3 | — |
| 11 | 2 | 0, 2 | — |
| 12 | 2 | 0, 2, 3 | — |
| 13 | 2 | 0 | 2 |
| 14 | 2 | 1 | 3 |
| 15 | 2 | 0, 1 | 2.3 |

TABLE 9

Example table of Antenna port(s) (1000 + DM-RS port), dmrs-Type = 2, maxLength = 1
One codeword:
Codeword 0 enabled,
Codeword 1 disabled

| Value | Number of DM-RS CDM group(s) without data | DM-RS port(s) | Other Inferred DM-RS port(s) |
|---|---|---|---|
| 0 | 1 | 0 | — |
| 1 | 1 | 1 | — |
| 2 | 1 | 0, 1 | — |
| 3 | 2 | 0 | — |
| 4 | 2 | 1 | — |
| 5 | 2 | 2 | — |
| 6 | 2 | 3 | — |
| 7 | 2 | 0, 1 | — |
| 8 | 2 | 2, 3 | — |

TABLE 9-continued

Example table of Antenna port(s) (1000 +
DM-RS port), dmrs-Type = 2, maxLength = 1
One codeword:
Codeword 0 enabled,
Codeword 1 disabled

| Value | Number of DM-RS CDM group(s) without data | DM-RS port(s) | Other Inferred DM-RS port(s) |
|---|---|---|---|
| 9 | 2 | 0-2 | — |
| 10 | 2 | 0-3 | — |
| 11 | 3 | 0 | — |
| 12 | 3 | 1 | — |
| 13 | 3 | 2 | — |
| 14 | 3 | 3 | — |
| 15 | 3 | 4 | — |
| 16 | 3 | 5 | — |
| 17 | 3 | 0, 1 | — |
| 18 | 3 | 2, 3 | — |
| 19 | 3 | 4, 5 | — |
| 20 | 3 | 0-2 | — |
| 21 | 3 | 3-5 | — |
| 22 | 3 | 0-3 | — |
| 23 | 2 | 0, 2 | — |
| 24 | 3 | 0 | 2, 4 |
| 25 | 3 | 1 | 3.5 |
| 26 | 3 | 0, 1 | {2, 4}, {3, 5} |
| 27-31 | Reserved | Reserved | Reserved |

According to embodiments of a third solution, the configuring and/or indicating (alternative, the activating) of DM-RS configuration Type-3 (or antenna ports grouping in another example), and the corresponding antenna ports is an explicit/implicit function of at least the SCS.

In one implementation of the third solution, one extra bit for DM-RS configuration type in higher layer parameters (DL-DMRS-config-type) is introduced to accommodate the new configuration Type-3. Here, the UE receives the configuration type from higher layers and correspondingly configures both DL and/or UL.

In another implementation of the third solution, the UE autonomously switches to a higher density DM-RS configuration for DL/UL upon receiving SCS configuration that is above a certain predefined threshold μn. In certain embodiments, the higher density DM-RS configuration is the DM-RS configuration Type-3, as discussed above. In other embodiments, the higher density DM-RS configuration uses DM-RS configuration Type-1 or DM-RS configuration Type-2, as discussed above.

In further implementation of the third solution, the UE autonomously uses Type1/Type2 DM-RS configuration with antenna ports grouping antenna ports for DL/UL upon receiving SCS configuration that is above a certain predefined threshold μn.

The predefined SCS threshold un can be a function of the expected or the reported delay spread value in CSI measurement report.

The indication of the number of front-loaded symbols can also be either semi-statically indicated or by dynamic indication or a combination of semi-static and dynamic indication (similar to existing NR specifications)

According to embodiments of a fourth solution, a dynamic configuration for DM-RS density in frequency within a CORESET is proposed, where a threshold in terms of subcarrier spacing is configured and/or indicated to the UE, and when the actual SCS value to be used for PDCCH transmission is above the threshold value, then a higher DM-RS density in frequency within CORESET can be applied, for example 4 DM-RS REs/PRB or REG (resource-element groups) in one symbol equally spread in frequency (e.g., every $3^{rd}$ subcarrier with a PRB or REG of 12 subcarriers).

In an example implementation, multiple threshold values can be configured and/or indicated and multiple DM-RS densities in frequency within a CORESET are configured and used depending upon the applied SCS value for PDCCH transmission.

In an alternate embodiment, when a CORESET occupies more than one symbols, then the first symbol of the CORESET can contain only DM-RS REs, while the following symbols of that given CORESET can contain only control data REs. For example, if CORESET is configured occupied symbols #0, 1 and 2 in time-domain and PRBs 3,4 and 5 in frequency domain (across all three symbols), then the PRBs 3, 4 and 5 in symbol #0 can be used only for DM-RS REs while the same PRB indices in symbols #2 and 3 can be used only for control data REs. This configuration can be indicated or activated depending upon the SCS value threshold.

In other embodiments, a combination of different DM-RS distribution in time and frequency within a given CORESET may be used.

In some embodiments, the terms antenna, panel, and antenna panel are used interchangeably. An antenna panel may be a hardware that is used for transmitting and/or receiving radio signals at frequencies lower than 6 GHz, e.g., frequency range 1 (FR1), or higher than 6 GHz, e.g., frequency range 2 (FR2) or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device (e.g., UE, node) antenna panel may be a physical or logical antenna array comprising a set of antenna elements or antenna ports that share a common or a significant portion of an RF chain (e.g., in-phase/quadrature ("I/Q") modulator, analog to digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier (LNA) power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to the RAN node. For certain condition(s), the RAN node or gNB can assume the mapping between device's physical antennas to the logical entity "device panel" may not be changed. For example, the condition may include until the next update or report from device or comprise a duration of time over which the RAN node assumes there will be no change to the mapping.

A Device may report its capability with respect to the "device panel" to the RAN node or network. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Two antenna ports may be quasi-located with respect to a subset of the large-scale properties and different subset of large-scale properties may be indicated by a Quasi-Co-Location ("QCL") Type. For example, the parameter qcl-Type may take one of the following values:
 'QCL-TypeA': {Doppler shift, Doppler spread, average delay, delay spread}
 'QCL-TypeB': {Doppler shift, Doppler spread}
 'QCL-TypeC': {Doppler shift, average delay}
 'QCL-TypeD': {Spatial Rx parameter}.

Spatial Rx parameters may include one or more of: angle of arrival ("AoA"), Dominant AoA, average AoA, angular spread, Power Angular Spectrum ("PAS") of AoA, average angle of departure ("AoD"), PAS of AoD, transmit/receive channel correlation, transmit/receive beamforming, spatial channel correlation etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

Figure 5:
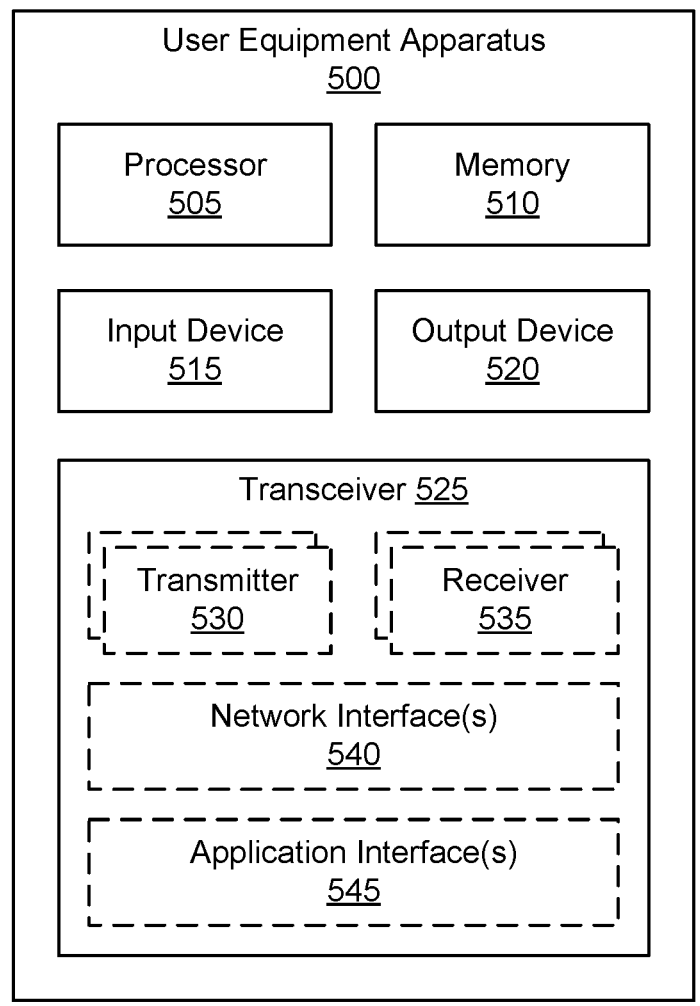
FIG. 5 is a diagram illustrating one embodiment of a user equipment apparatus that may be used for enhanced DM-RS configuration.

FIG. 5 depicts a user equipment apparatus 500 that may be used for performing enhanced DM-RS configuration, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panels supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PCS, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In certain embodiments, the processor 505 may include an application processor (also known as "main processor") which manages application-domain and operating system ("OS") functions and a baseband processor (also known as "baseband radio processor") which manages radio functions.

In various embodiments, via the transceiver 525, the processor 505 receives a first indication of a configuration for DM-RS, where the DM-RS configuration including a plurality of DM-RS configuration types. The processor 505 also receives, via the transceiver 525, a second indication to autonomously switch among the plurality of DM-RS configuration types based on a configured SCS value for a channel Additionally, the processor 505 performs single channel estimation from multiple indicated antenna ports using the DM-RS configuration.

In some embodiments, the processor 505 receives the first indication by receiving downlink control information containing the first indication. In some embodiments, the DM-RS configuration for a shared channel for use at high SCS values maps DM-RS to every RE in frequency domain in an OFDM symbol with no interval between the DM-RS REs, the shared channel being one of: a PDSCH and a PUSCH.

In some embodiments, the processor 505 receives a DM-RS configuration type from higher layers and correspondingly configures downlink operation and/or uplink operation. In some embodiments, the processor 505 autonomously switches to a different DM-RS configuration type in response to receiving an SCS configuration that is above a predefined threshold.

In some embodiments, the first indication contains a dynamic configuration for DM-RS density in frequency domain within a CORESET. In such embodiments, the processor 505 further receives a threshold SCS value (e.g., configured and/or dynamically indicated to the UE). Here, the processor 505 applies a DM-RS configuration type having a high-density frequency domain mapping of DM-RS REs within the CORESET in response to an actual SCS value to be used for control channel (e.g., PDCCH) transmission being above the threshold SCS value.

In certain embodiments, the CORESET occupies more than one OFDM symbol in a slot. In such embodiments, the mapping of DM-RS REs within the CORESET configures DM-RS on every RE of a first symbol of the slot and no DM-RS configured in a remainder of symbols of the slot.

In some embodiments, the transceiver 505 receives a third indication to link a plurality of antenna ports from different CDM groups to retrieve the channel on an indicated antenna port. In such embodiments, performing single channel estimation from multiple indicated antenna ports using the DM-RS includes performing single channel estimation for the indicated antenna port using DM-RS REs corresponding to the linked antenna ports.

In certain embodiments, the third indication links (i.e., groups) a plurality of antenna ports of a first CDM group with a plurality of antenna ports of a second CDM group. In certain embodiments, the third indication links (i.e., groups) multiple antenna ports of a common DM-RS type, the common DM-RS being one of: DM-RS Type-1 and DM-RS Type-2. In certain embodiments, the third indication links together the even antenna ports of the different CDM groups and further links together the odd antenna ports of the different CDM groups.

In some embodiments, the first and third indications comprise an index value of a predefined table entry. In such embodiments, the predefined table entry indicates: a DM-RS configuration type having a high-density frequency domain mapping of DM-RS REs, a set of antenna ports corresponding to the DM-RS configuration, and a DM-RS symbol length. In certain embodiments, the set of antenna ports includes two antenna ports when the DM-RS symbol length is one OFDM symbol and the set of antenna ports includes four antenna ports when the DM-RS symbol length is two OFDM symbols.

In certain embodiments, the predefined table entry further indicates a number of CDM groups. In such embodiments, the set of antenna ports corresponding to the DM-RS configuration are considered as linked ports corresponding to an indicated antenna port. In certain embodiments, the processor 505 ignores the linking of antenna ports in response to determining that a table entry corresponds to an invalid grouping.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to enhanced DM-RS configuration. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
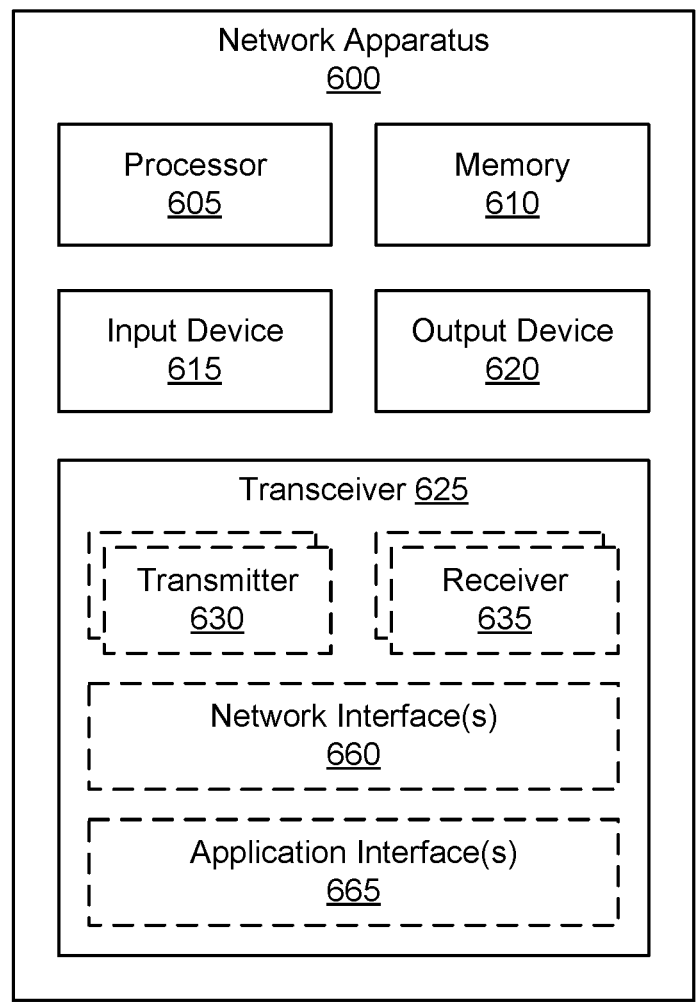
FIG. 6 is a diagram illustrating one embodiment of a network apparatus that may be used for enhanced DM-RS configuration.

FIG. 6 depicts a network apparatus 600 that may be used for performing enhanced DM-RS configuration, according to embodiments of the disclosure. In one embodiment, network apparatus 600 may be one implementation of a RAN node, such as the base unit 121 and/or the RAN node 210, as described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 65. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

In various embodiments, the processor 605 determines a configuration for DM-RS, the DM-RS configuration including a plurality of DM-RS configuration types. The processor 605 controls the transceiver 625 to transmit, to a UE, a first indication of the DM-RS configuration and also a second indication to autonomously switch among the plurality of DM-RS configuration types based on a configured SCS value for a channel. The transceiver 625 further transmits, to the UE, DM-RS on a shared channel according to the DM-RS configuration, the shared channel being one of: a PDSCH and a PUSCH.

In some embodiments, transmitting the first indication includes transmitting downlink control information containing the first indication. In some embodiments, the DM-RS configuration for the shared channel for use at high SCS values maps DM-RS to every RE in frequency domain in an OFDM symbol with no interval between the DM-RS REs.

In some embodiments, the first indication contains a dynamic configuration for DM-RS density in frequency domain within a CORESET. In such embodiments, the processor 605 controls the transceiver 625 to transmit a threshold SCS value (e.g., configured and/or dynamically indicated to the UE). In further embodiments, the UE applies a DM-RS configuration type having a high-density frequency domain mapping of DM-RS REs within the CORESET in response to an actual SCS value to be used for control channel (e.g., PDCCH) transmission being above the threshold SCS value.

In certain embodiments, the CORESET occupies more than one OFDM symbol in a slot. In such embodiments, the mapping of DM-RS REs within the CORESET configures DM-RS on every RE of a first symbol of the slot and no DM-RS configured in a remainder of symbols of the slot.

In some embodiments, the processor 605 controls the transceiver 625 to transmit a third indication to link a plurality of antenna ports from different CDM groups to retrieve the channel on an indicated antenna port. In such embodiments, the UE performs single channel estimation for the indicated antenna port using DM-RS REs corresponding to the linked antenna ports.

In certain embodiments, the third indication links (i.e., groups) a plurality of antenna ports of a first CDM group with a plurality of antenna ports of a second CDM group. In certain embodiments, the third indication links (i.e., groups) multiple antenna ports of a common DM-RS type, the common DM-RS being one of: DM-RS type-1 and DM-RS type-2. In certain embodiments, the third indication links together the even antenna ports of the different CDM groups and further links together the odd antenna ports of the different CDM groups.

In some embodiments, the first and third indications comprise an index value of a predefined table entry. In such embodiments, the predefined table entry may indicate: a DM-RS configuration type having a high-density frequency domain mapping of DM-RS REs, a set of antenna ports corresponding to the DM-RS configuration, and a DM-RS symbol length. In certain embodiments, the set of antenna ports includes two antenna ports when the DM-RS symbol length is one OFDM symbol and the set of antenna ports includes four antenna ports when the DM-RS symbol length is two OFDM symbols.

In certain embodiments, the predefined table entry further indicates a number of CDM groups. In such embodiments, the set of antenna ports corresponding to the DM-RS configuration are considered as linked ports corresponding to an indicated antenna port. In certain embodiments, the processor 605 ignores the linking of antenna ports in response to determining that a table entry corresponds to an invalid grouping.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to enhanced DM-RS configuration. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
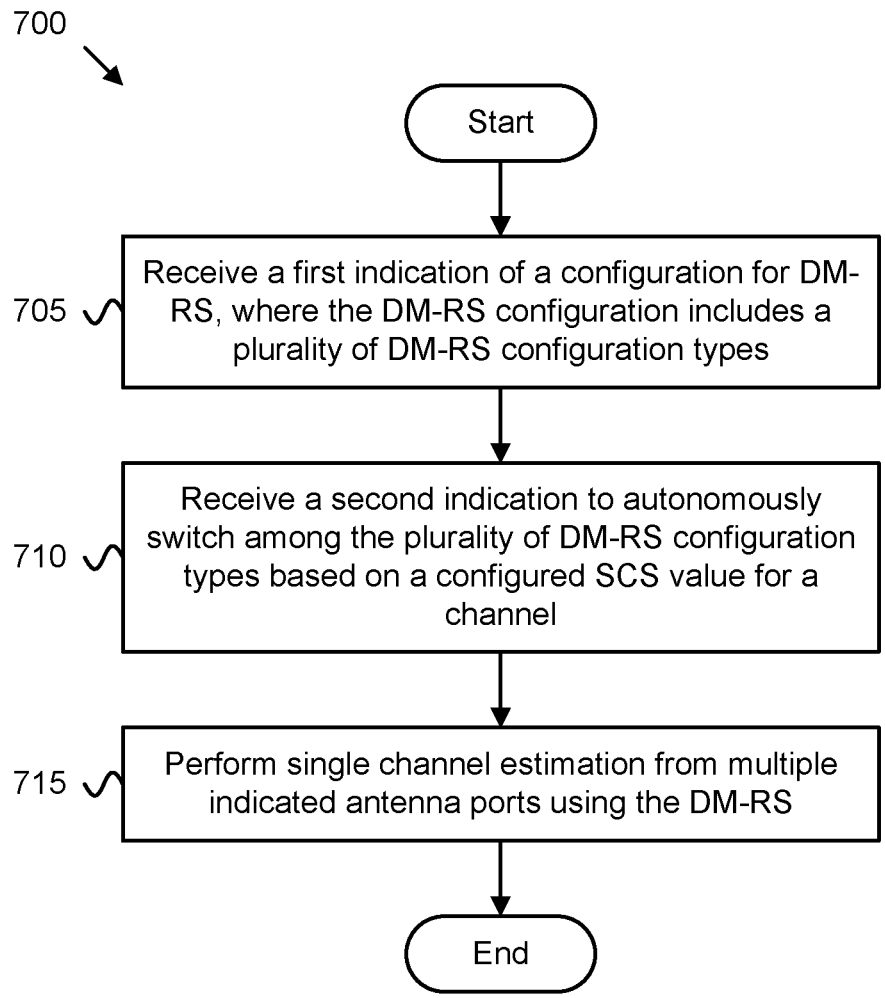
FIG. 7 is a flowchart diagram illustrating one embodiment of a first method for enhanced DM-RS configuration.

FIG. 7 depicts one embodiment of a method 700 for enhanced DM-RS configuration, according to embodiments of the disclosure. In various embodiments, the method 700 is performed by a user equipment device in a mobile communication network, such as the remote unit 105, the UE 205, and/or the user equipment apparatus 500, described above. In some embodiments, the method 700 is performed by a processor, such as a microcontroller, a microprocessor, a CPU, a GPU, an auxiliary processing unit, a FPGA, or the like.

The method 700 begins and receives 705 a first indication of a configuration for DM-RS, where the DM-RS configuration includes a plurality of DM-RS configuration types. The method 700 includes receiving 710 a second indication to autonomously switch among the plurality of DM-RS configuration types based on a configured subcarrier spacing ("SCS") value for a channel. The method 700 includes performing 715 single channel estimation from multiple indicated antenna ports using the DM-RS. The method 700 ends.

Figure 8:
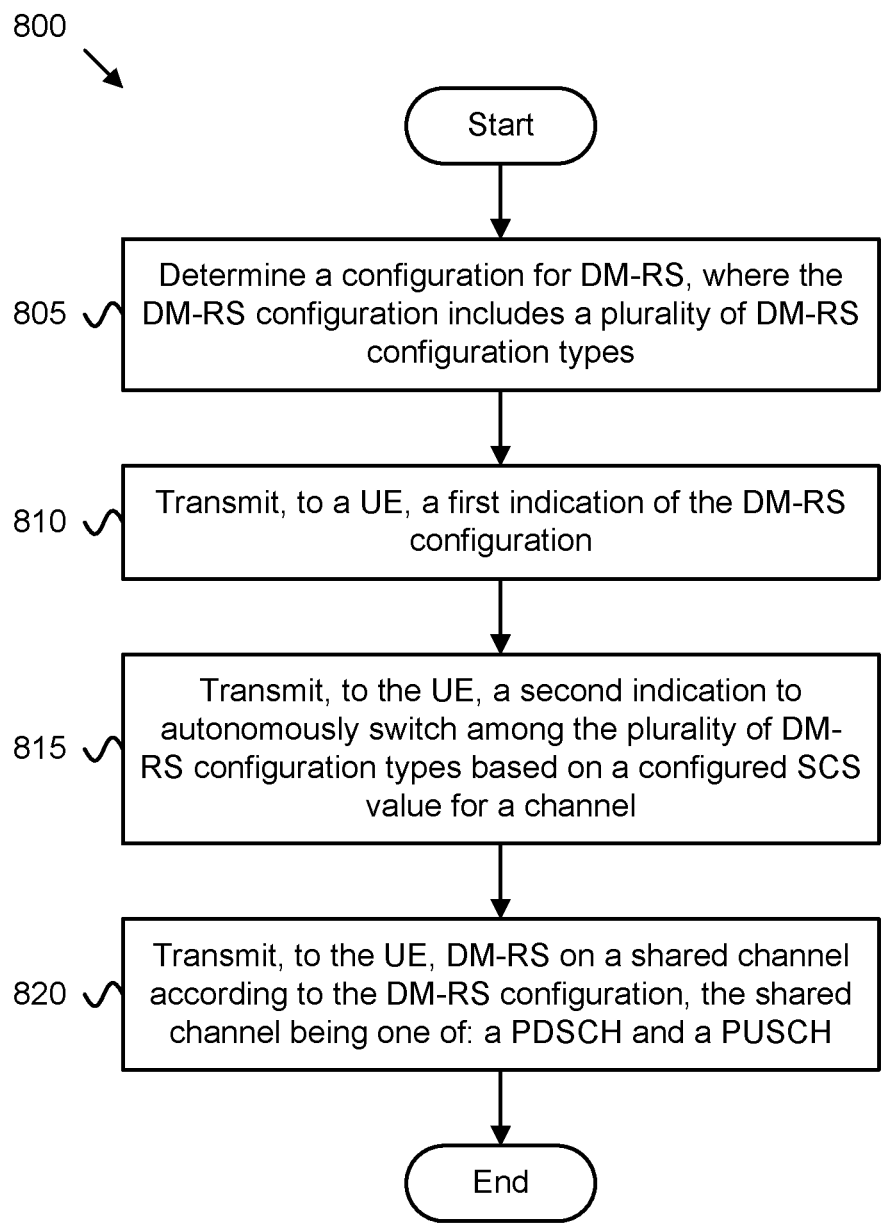
FIG. 8 is a flowchart diagram illustrating one embodiment of a second method for enhanced DM-RS configuration.

FIG. 8 depicts one embodiment of a method 800 for enhanced DM-RS configuration, according to embodiments of the disclosure. In various embodiments, the method 800 is performed by a RAN device in a mobile communication network, such as the base unit 121, the RAN node 210, and/or the network equipment apparatus 600, described above. In some embodiments, the method 800 is performed by a processor, such as a microcontroller, a microprocessor, a CPU, a GPU, an auxiliary processing unit, a FPGA, or the like.

The method 800 begins and includes determining 805 a configuration for DM-RS, where the DM-RS configuration includes a plurality of DM-RS configuration types. The method 800 includes transmitting 810, to a UE, a first indication of the DM-RS configuration. The method 800 includes transmitting 815, to the UE, a second indication to autonomously switch among the plurality of DM-RS configuration types based on a configured SCS value for a channel. The method 800 further includes transmitting 820, to the UE, DM-RS on a shared channel according to the DM-RS configuration, the shared channel being one of: a PDSCH and a PUSCH. The method 800 ends.

Disclosed herein is a first apparatus for enhanced DM-RS configuration, according to embodiments of the disclosure. The first apparatus may be implemented by a user equipment device in a mobile communication network, such as the remote unit 105, the UE 205, and/or the user equipment apparatus 500, described above. The first apparatus includes a processor and a transceiver that receives a first indication of a configuration for DM-RS, where the DM-RS configuration including a plurality of DM-RS configuration types. The transceiver receives a second indication to autonomously switch among the plurality of DM-RS configuration types based on a configured SCS value for a channel. The processor performs single channel estimation from multiple indicated antenna ports using the DM-RS configuration.

In some embodiments, receiving the first indication includes receiving downlink control information containing the first indication. In some embodiments, the DM-RS configuration for a shared channel for use at high SCS values maps DM-RS to every RE in frequency domain in an OFDM symbol with no interval between the DM-RS REs, the shared channel being one of: a PDSCH and a PUSCH.

In some embodiments, the transceiver receives a DM-RS configuration type from higher layers and the processor correspondingly configures downlink operation and/or uplink operation. In some embodiments, the processor autonomously switches to a different DM-RS configuration type in response to receiving an SCS configuration that is above a predefined threshold.

In some embodiments, the first indication contains a dynamic configuration for DM-RS density in frequency domain within a CORESET. In such embodiments, the processor further receives a threshold SCS value (e.g., configured and/or dynamically indicated to the UE), where the processor applies a DM-RS configuration type having a high-density frequency domain mapping of DM-RS REs within the CORESET in response to an actual SCS value to be used for control channel (e.g., PDCCH) transmission being above the threshold SCS value.

In certain embodiments, the CORESET occupies more than one OFDM symbol in a slot. In such embodiments, the mapping of DM-RS REs within the CORESET configures DM-RS on every RE of a first symbol of the slot and no DM-RS configured in a remainder of symbols of the slot.

In some embodiments, the transceiver receives a third indication to link a plurality of antenna ports from different CDM groups to retrieve the channel on an indicated antenna port. In such embodiments, performing single channel estimation from multiple indicated antenna ports using the DM-RS includes performing single channel estimation for the indicated antenna port using DM-RS REs corresponding to the linked antenna ports.

In certain embodiments, the third indication links (i.e., groups) a plurality of antenna ports of a first CDM group with a plurality of antenna ports of a second CDM group. In certain embodiments, the third indication links (i.e., groups) multiple antenna ports of a common DM-RS type, the common DM-RS being one of: DM-RS Type-1 and DM-RS Type-2. In certain embodiments, the third indication links together the even antenna ports of the different CDM groups and further links together the odd antenna ports of the different CDM groups.

In some embodiments, the first and third indications comprise an index value of a predefined table entry. In such embodiments, the predefined table entry indicates: a DM-RS configuration type having a high-density frequency domain mapping of DM-RS REs, a set of antenna ports corresponding to the DM-RS configuration, and a DM-RS symbol length. In certain embodiments, the set of antenna ports includes two antenna ports when the DM-RS symbol length is one OFDM symbol and the set of antenna ports includes four antenna ports when the DM-RS symbol length is two OFDM symbols.

In certain embodiments, the predefined table entry further indicates a number of CDM groups. In such embodiments, the set of antenna ports corresponding to the DM-RS configuration are considered as linked ports corresponding to an indicated antenna port. In certain embodiments, the processor ignores the linking of antenna ports in response to determining that a table entry corresponds to an invalid grouping.

Disclosed herein is a first method for enhanced DM-RS configuration, according to embodiments of the disclosure. The first method may be performed by a user equipment device in a mobile communication network, such as the remote unit 105, the UE 205, and/or the user equipment apparatus 500, described above. The first method includes receiving a first indication of a configuration for DM-RS, the DM-RS configuration including a plurality of DM-RS configuration types. The method includes receiving a second indication to autonomously switch among the plurality of DM-RS configuration types based on a configured SCS value. The method includes performing a single channel estimation from multiple indicated antenna ports using the DM-RS.

In some embodiments, receiving the first indication includes receiving downlink control information containing the first indication. In some embodiments, the DM-RS configuration for a shared channel for use at high SCS values maps DM-RS to every RE in frequency domain in an OFDM symbol with no interval between the DM-RS REs, the shared channel being one of: a PDSCH and a PUSCH.

In some embodiments, the first method includes receiving a DM-RS configuration type from higher layers and correspondingly configuring downlink operation and/or uplink operation. In some embodiments, the UE autonomously switches to a different DM-RS configuration type in response to receiving an SCS configuration that is above a predefined threshold.

In some embodiments, the first indication contains a dynamic configuration for DM-RS density in frequency domain within a CORESET. In such embodiments, the first method includes receiving a threshold SCS value (e.g., configured and/or dynamically indicated to the UE) and applying a DM-RS configuration type having a high-density frequency domain mapping of DM-RS REs within the CORESET in response to an actual SCS value to be used for control channel (e.g., PDCCH) transmission being above the threshold SCS value.

In certain embodiments, the CORESET occupies more than one OFDM symbol in a slot. In such embodiments, the mapping of DM-RS REs within the CORESET configures DM-RS on every RE of a first symbol of the slot and no DM-RS configured in a remainder of symbols of the slot.

In some embodiments, the first method includes receiving a third indication to link a plurality of antenna ports from different CDM groups to retrieve the channel on an indicated antenna port. In such embodiments, performing single channel estimation from multiple indicated antenna ports using the DM-RS includes performing single channel estimation for the indicated antenna port using DM-RS REs corresponding to the linked antenna ports.

In certain embodiments, the third indication links (i.e., groups) a plurality of antenna ports of a first CDM group with a plurality of antenna ports of a second CDM group. In certain embodiments, the third indication links (i.e., groups) multiple antenna ports of a common DM-RS type, the common DM-RS being one of: DM-RS Type-1 and DM-RS Type-2. In certain embodiments, the third indication links together the even antenna ports of the different CDM groups and further links together the odd antenna ports of the different CDM groups.

In some embodiments, the first and third indications comprise an index value of a predefined table entry. In such embodiments, the predefined table entry indicates: a DM-RS configuration type having a high-density frequency domain mapping of DM-RS REs, a set of antenna ports corresponding to the DM-RS configuration, and a DM-RS symbol length. In certain embodiments, the set of antenna ports includes two antenna ports when the DM-RS symbol length is one OFDM symbol and the set of antenna ports includes four antenna ports when the DM-RS symbol length is two OFDM symbols.

In certain embodiments, the predefined table entry further indicates a number of CDM groups. In such embodiments, the set of antenna ports corresponding to the DM-RS configuration are considered as linked ports corresponding to an indicated antenna port. In certain embodiments, the first method further includes ignoring the linking of antenna ports in response to determining that a table entry corresponds to an invalid grouping.

Disclosed herein is a second apparatus for enhanced DM-RS configuration, according to embodiments of the disclosure. The second apparatus may be implemented by a RAN device in a mobile communication network, such as the base unit 121, the RAN node 210, and/or the network equipment apparatus 600, described above. The second apparatus includes a transceiver and a processor that determines a configuration for DM-RS, the DM-RS configuration including a plurality of DM-RS configuration types. The transceiver transmits, to a UE, a first indication of the DM-RS configuration and transmits, also to the UE, a second indication to autonomously switch among the plurality of DM-RS configuration types based on a configured SCS value for a channel. The transceiver further transmits, to the UE, DM-RS on a shared channel according to the DM-RS configuration, the shared channel being one of: a PDSCH and a PUSCH.

In some embodiments, transmitting the first indication includes transmitting downlink control information containing the first indication. In some embodiments, the DM-RS configuration for the shared channel for use at high SCS values maps DM-RS to every RE in frequency domain in an OFDM symbol with no interval between the DM-RS REs.

In some embodiments, the first indication contains a dynamic configuration for DM-RS density in frequency domain within a CORESET. In such embodiments, the transceiver further transmits a threshold SCS value (e.g., configured and/or dynamically indicated to the UE). In further embodiments, the UE applies a DM-RS configuration type having a high-density frequency domain mapping of DM-RS REs within the CORESET in response to an actual SCS value to be used for control channel (e.g., PDCCH) transmission being above the threshold SCS value.

In certain embodiments, the CORESET occupies more than one OFDM symbol in a slot. In such embodiments, the mapping of DM-RS REs within the CORESET configures DM-RS on every RE of a first symbol of the slot and no DM-RS configured in a remainder of symbols of the slot.

In some embodiments, the transceiver transmits a third indication to link a plurality of antenna ports from different CDM groups to retrieve the channel on an indicated antenna port. In such embodiments, the UE performs single channel estimation for the indicated antenna port using DM-RS REs corresponding to the linked antenna ports.

In certain embodiments, the third indication links (i.e., groups) a plurality of antenna ports of a first CDM group with a plurality of antenna ports of a second CDM group. In certain embodiments, the third indication links (i.e., groups) multiple antenna ports of a common DM-RS type, the common DM-RS being one of: DM-RS type-1 and DM-RS type-2. In certain embodiments, the third indication links together the even antenna ports of the different CDM groups and further links together the odd antenna ports of the different CDM groups.

In some embodiments, the first and third indications comprise an index value of a predefined table entry. In such embodiments, the predefined table entry may indicate: a DM-RS configuration type having a high-density frequency domain mapping of DM-RS REs, a set of antenna ports corresponding to the DM-RS configuration, and a DM-RS symbol length. In certain embodiments, the set of antenna ports includes two antenna ports when the DM-RS symbol length is one OFDM symbol and the set of antenna ports includes four antenna ports when the DM-RS symbol length is two OFDM symbols.

In certain embodiments, the predefined table entry further indicates a number of CDM groups. In such embodiments, the set of antenna ports corresponding to the DM-RS configuration are considered as linked ports corresponding to an indicated antenna port. In certain embodiments, the processor ignores the linking of antenna ports in response to determining that a table entry corresponds to an invalid grouping.

Disclosed herein is a second method for enhanced DM-RS configuration, according to embodiments of the disclosure. The second method may be performed by a RAN device in a mobile communication network, such as the base unit 121, the RAN node 210, and/or the network equipment apparatus 600, described above. The second method includes determining a configuration for DM-RS, where the DM-RS configuration includes a plurality of DM-RS configuration types. The second method includes transmitting, to a UE, a first indication of the DM-RS configuration. The second method includes transmitting, to the UE, a second indication to autonomously switch among the plurality of DM-RS configuration types based on a configured SCS value for a channel. The second method further includes transmitting, to the UE, DM-RS on a shared channel according to the DM-RS configuration, the shared channel being one of: a PDSCH and a PUSCH.

In some embodiments, transmitting the first indication includes transmitting downlink control information containing the first indication. In some embodiments, the DM-RS configuration for the shared channel for use at high SCS values maps DM-RS to every RE in frequency domain in an OFDM symbol with no interval between the DM-RS REs.

In some embodiments, the first indication comprises a dynamic configuration for DM-RS density in frequency domain within a CORESET. In such embodiments, the second method includes transmitting a threshold SCS value (e.g., configured and/or dynamically indicated to the UE). In such embodiments, the UE applies a DM-RS configuration type having a high-density frequency domain mapping of DM-RS REs within the CORESET in response to an actual SCS value to be used for control channel (e.g., PDCCH) transmission being above the threshold SCS value.

In certain embodiments, the CORESET occupies more than one OFDM symbol in a slot. In such embodiments, the mapping of DM-RS REs within the CORESET configures DM-RS on every RE of a first symbol of the slot and no DM-RS configured in a remainder of symbols of the slot.

In some embodiments, the second method includes transmitting a third indication to link a plurality of antenna ports from different CDM groups to retrieve the channel on an indicated antenna port. In such embodiments, the UE performs single channel estimation for the indicated antenna port using DM-RS REs corresponding to the linked antenna ports.

In certain embodiments, the third indication links (i.e., groups) a plurality of antenna ports of a first CDM group with a plurality of antenna ports of a second CDM group. In certain embodiments, the third indication links (i.e., groups) multiple antenna ports of a common DM-RS type, the common DM-RS being one of: DM-RS type-1 and DM-RS type-2. In certain embodiments, the third indication links together the even antenna ports of the different CDM groups and further links together the odd antenna ports of the different CDM groups.

In some embodiments, the first and third indications comprise an index value of a predefined table entry. In such embodiments, the predefined table entry indicates: a DM-RS configuration type having a high-density frequency domain mapping of DM-RS REs, a set of antenna ports corresponding to the DM-RS configuration, and a DM-RS symbol length.

In certain embodiments, the set of antenna ports includes two antenna ports when the DM-RS symbol length is one OFDM symbol and wherein the set of antenna ports comprises four antenna ports when the DM-RS symbol length is two OFDM symbols.

In certain embodiments, the predefined table entry further indicates a number of CDM groups, wherein the set of antenna ports corresponding to the DM-RS configuration are considered as linked ports corresponding to an indicated antenna port. In certain embodiments, the second method further includes ignoring the linking of antenna ports in response to determining that a table entry corresponds to an invalid grouping.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment ("UE"), the method comprising:
   receiving a threshold subcarrier spacing ("SCS") value;
   receiving a first indication of a demodulation reference signal ("DM-RS") configuration, the DM-RS configuration including a plurality of DM-RS configuration types, wherein the first indication comprises a dynamic configuration for DM-RS density in frequency domain within a control resource set ("CORESET");
   receiving a second indication to autonomously switch from a first DM-RS configuration type of the plurality of DM-RS configuration types to a second DM-RS configuration type of the plurality of DM-RS configuration types in response to an actual SCS value to be used for a channel being above the threshold SCS value;
   applying the second DM-RS configuration type within the CORESET in response to the actual SCS value being used for a control channel transmission and the actual SCS value being above the threshold SCS value, wherein the second DM-RS configuration type corresponds to a high-density frequency domain mapping of DM-RS resource elements ("REs ");
   receiving a third indication indicating multiple antenna ports; and
   performing single channel estimation from the multiple indicated antenna ports using the second DM-RS configuration type.

2. The method of claim 1, wherein receiving the first indication comprises receiving downlink control information ("DCI") containing the first indication.

3. The method of claim 1, wherein the DM-RS configuration for a shared channel for use at high SCS values maps DM-RS to every RE in frequency domain in an OFDM symbol with no interval between the DM-RS REs, the shared channel being a physical downlink shared channel ("PDSCH") or a physical uplink shared channel ("PUSCH").

4. The method of claim 1, further comprising receiving a DM-RS configuration type from higher layers and correspondingly configuring downlink operation and/or uplink operation.

5. The method of claim 1, wherein the UE autonomously switches to a different DM-RS configuration type in response to receiving an SCS configuration that is above a predefined threshold.

6. The method of claim 1, wherein the CORESET occupies more than one OFDM symbol in a slot, wherein a mapping of DM-RS REs within the CORESET configures a DM-RS on every RE of a first OFDM symbol of the slot and no DM-RS configured in a remainder of OFDM symbols of the slot.

7. The method of claim 1, wherein the third indication comprises an indication to link a plurality of antenna ports from different code division multiplexing ("CDM") groups to retrieve the channel on an indicated antenna port, and wherein performing single channel estimation from multiple indicated antenna ports using the DM-RS comprises performing single channel estimation for the indicated antenna port using DM-RS REs corresponding to the linked plurality of antenna ports.

8. The method of claim 7, wherein the third indication links a first plurality of antenna ports of a first CDM group with a second plurality of antenna ports of a second CDM group.

9. The method of claim 7, wherein the third indication links multiple antenna ports of a common DM-RS type, the common DM-RS being one of: DM-RS type-1 and DM-RS type-2.

10. The method of claim 7, wherein the third indication links together a set of even antenna ports of the different CDM groups and further links together a set of odd antenna ports of the different CDM groups.

11. The method of claim 7, wherein the first indication or the third indication, or both, comprise an index value of a predefined table entry, wherein the predefined table entry indicates:
one or more DM-RS configuration types having a high-density frequency domain mapping of DM-RS REs;
a set of antenna ports corresponding to the one or more DM-RS configurations; and
a DM-RS symbol length.

12. The method of claim 11, wherein the set of antenna ports comprises two antenna ports when the DM-RS symbol length is one OFDM symbol and wherein the set of antenna ports comprises four antenna ports when the DM-RS symbol length is two OFDM symbols.

13. The method of claim 11, wherein the predefined table entry further indicates a number of CDM groups, wherein the set of antenna ports corresponding to the DM-RS configuration are considered as linked ports corresponding to an indicated antenna port.

14. The method of claim 11, further comprising ignoring the linking of antenna ports in response to determining that a table entry corresponds to an invalid grouping.

15. A user equipment ("UE") for wireless communication, comprising:
a memory; and
at least one processor coupled with the memory and configured to cause the UE to:
receive a threshold subcarrier spacing ("SCS") value;
receives a first indication of a demodulation reference signal ("DM-RS") configuration, the DM-RS configuration including a plurality of DM-RS configuration types, wherein the first indication comprises a dynamic configuration for DM-RS density in frequency domain within a control resource set ("CORESET");
receives a second indication to autonomously switch from a first DM-RS configuration type of the plurality of DM-RS configuration types to a second DM-RS configuration type of the plurality of DM-RS configuration types in response to an actual SCS value to be used for a channel being above the threshold SCS value;
applying the second DM-RS configuration type within the CORESET in response to the actual SCS value being used for a control channel transmission and the actual SCS value being above the threshold SCS value, wherein the second DM-RS configuration type corresponds to a high-density frequency domain mapping of DM-RS resource elements ("REs");
receive a third indication indicating multiple antenna ports; and
perform single channel estimation from the multiple indicated antenna ports using the second DM-RS configuration type.

16. The UE of claim 15, wherein the third indication comprises an indication to link a plurality of antenna ports from different code division multiplexing ("CDM") groups to receive the channel on an indicated antenna port, and wherein the processor is configured to cause the UE to:
perform a single channel estimation for the indicated antenna port using DM-RS REs corresponding to the linked antenna ports.

17. A method performed by a base station, the method comprising:
determining a demodulation reference signal ("DM-RS") configuration, the DM-RS configuration including a plurality of DM-RS configuration types;
transmitting, to a user equipment ("UE"), a first indication of the DM-RS configuration, wherein the first indication comprises a dynamic configuration for DM-RS density in frequency domain within a control resource set ("CORESET");
transmitting a threshold subcarrier spacing ("SCS") value;
transmitting, to the UE, a second indication to autonomously switch from a first DM-RS configuration type of the plurality of DM-RS configuration types to a second DM-RS configuration type of the plurality of DM-RS configuration types in response to an actual SCS value to be used for a channel being above the threshold SCS value;
using the second DM-RS configuration type within the CORESET in response to the actual SCS value being used for a control channel transmission and the actual SCS value being above the threshold SCS value, wherein the second DM-RS configuration type corresponds to a high-density frequency domain mapping of DM-RS resource elements ("REs")
transmitting a third indication indicating multiple antenna ports; and
transmitting, to the UE, DM-RS on a shared channel according to the DM-RS configuration, the shared channel being a physical downlink shared channel ("PDSCH") or a physical uplink shared channel ("PUSCH").

18. The method of claim 17, wherein the third indication comprises an indication to link a plurality of antenna ports from different code division multiplexing ("CDM") groups for a reception of the channel on an indicated antenna port, and wherein the method further comprises transmitting a set of DM-RS for single channel estimation for the indicated antenna port using DM-RS REs corresponding to the linked plurality of antenna ports.

19. The method of claim 17, wherein the DM-RS configuration for a shared channel for use at high SCS values maps DM-RS to every RE in frequency domain in an OFDM symbol with no interval between the DM-RS REs.

* * * * *